US011258953B2

(12) United States Patent
Ito et al.

(10) Patent No.: US 11,258,953 B2
(45) Date of Patent: Feb. 22, 2022

(54) IMAGE PROCESSING DEVICE

(71) Applicant: AISIN SEIKI KABUSHIKI KAISHA, Kariya (JP)

(72) Inventors: Kota Ito, Oobu (JP); Haruyuki Horie, Okazaki (JP); Miki Tsujino, Wako (JP)

(73) Assignee: AISIN SEIKI KABUSHIKI KAISHA, Kariya (JP)

( * ) Notice: Subject to any disclaimer, the term of this patent is extended or adjusted under 35 U.S.C. 154(b) by 114 days.

(21) Appl. No.: 15/992,990

(22) Filed: May 30, 2018

(65) Prior Publication Data
US 2018/0359399 A1  Dec. 13, 2018

(30) Foreign Application Priority Data

Jun. 9, 2017 (JP) .............. JP2017-114468
Mar. 12, 2018 (JP) .............. JP2018-044493

(51) Int. Cl.
*G06T 7/11* (2017.01)
*H04N 5/235* (2006.01)
(Continued)

(52) U.S. Cl.
CPC ............. *H04N 5/235* (2013.01); *G06T 5/007* (2013.01); *G06T 5/50* (2013.01); *G06T 7/11* (2017.01); *G06T 7/90* (2017.01); *H04N 5/23238* (2013.01); *H04N 5/23293* (2013.01); *H04N 5/247* (2013.01); *H04N 9/64* (2013.01); *G06T 2207/10016* (2013.01); *G06T 2207/10024* (2013.01); *G06T 2207/20076* (2013.01);
(Continued)

(58) Field of Classification Search
None
See application file for complete search history.

(56) References Cited

U.S. PATENT DOCUMENTS 5,619,347 A   4/1997 Taniguchi et al.
7,139,412 B2* 11/2006 Kato ............. B60R 1/00
                                          382/104
(Continued)

FOREIGN PATENT DOCUMENTS

JP   8-98204 A      4/1996
JP   2010-113424 A  5/2010
(Continued)

OTHER PUBLICATIONS

Communication dated Aug. 3, 2021 from the China National Intellectual Property Administration in CN Application No. 201810443143.8.

*Primary Examiner* — Vikkram Bali
(74) *Attorney, Agent, or Firm* — Sughrue Mion, PLLC

(57) ABSTRACT

According to one embodiment, the image processing device includes imagers disposed on an outer circumference of a mobile object for imaging surroundings of the mobile object to generate multiple images including mutually overlapping regions, and a processor that corrects the images on the basis of one color-value mean value and another color-value mean value to generate a peripheral image by combining the corrected images. The one color-value mean value is an average of color values of a target region set in an overlapping region of one of the images. Another color-value mean value is an average of color values of a target region set in an overlapping region of another one of the images.

11 Claims, 12 Drawing Sheets

(51) Int. Cl.
　　　*G06T 7/90*　　　(2017.01)
　　　*H04N 5/247*　　(2006.01)
　　　*G06T 5/50*　　　(2006.01)
　　　*H04N 9/64*　　　(2006.01)
　　　*G06T 5/00*　　　(2006.01)
　　　*H04N 5/232*　　(2006.01)

(52) U.S. Cl.
　　　CPC .............. *G06T 2207/20216* (2013.01); *G06T 2207/30252* (2013.01)

(56) References Cited

U.S. PATENT DOCUMENTS

| | | |
|---|---|---|
| 8,493,447 B2 | 7/2013 | Kaneko et al. |
| 10,455,159 B2 | 10/2019 | Okada et al. |
| 2002/0145678 A1* | 10/2002 | Suzuki .................... H04N 9/64 348/675 |
| 2002/0196340 A1 | 12/2002 | Kato et al. |
| 2010/0110234 A1 | 5/2010 | Kaneko et al. |
| 2013/0287316 A1 | 10/2013 | Kaneko et al. |
| 2016/0269597 A1* | 9/2016 | Kanatani .............. H04N 5/2351 |
| 2017/0171444 A1 | 6/2017 | Okada et al. |

FOREIGN PATENT DOCUMENTS

| | | |
|---|---|---|
| JP | 4739122 B2 | 8/2011 |
| JP | 2011-181019 A | 9/2011 |
| JP | 2011-223075 A | 11/2011 |
| WO | 2015/079702 A1 | 6/2015 |

* cited by examiner

COLOR-DIFFERENCE DIFFERENCE DETERMINATION PROCESS

UPPER-LIMIT CORRECTION VALUE DETERMINATION PROCESS

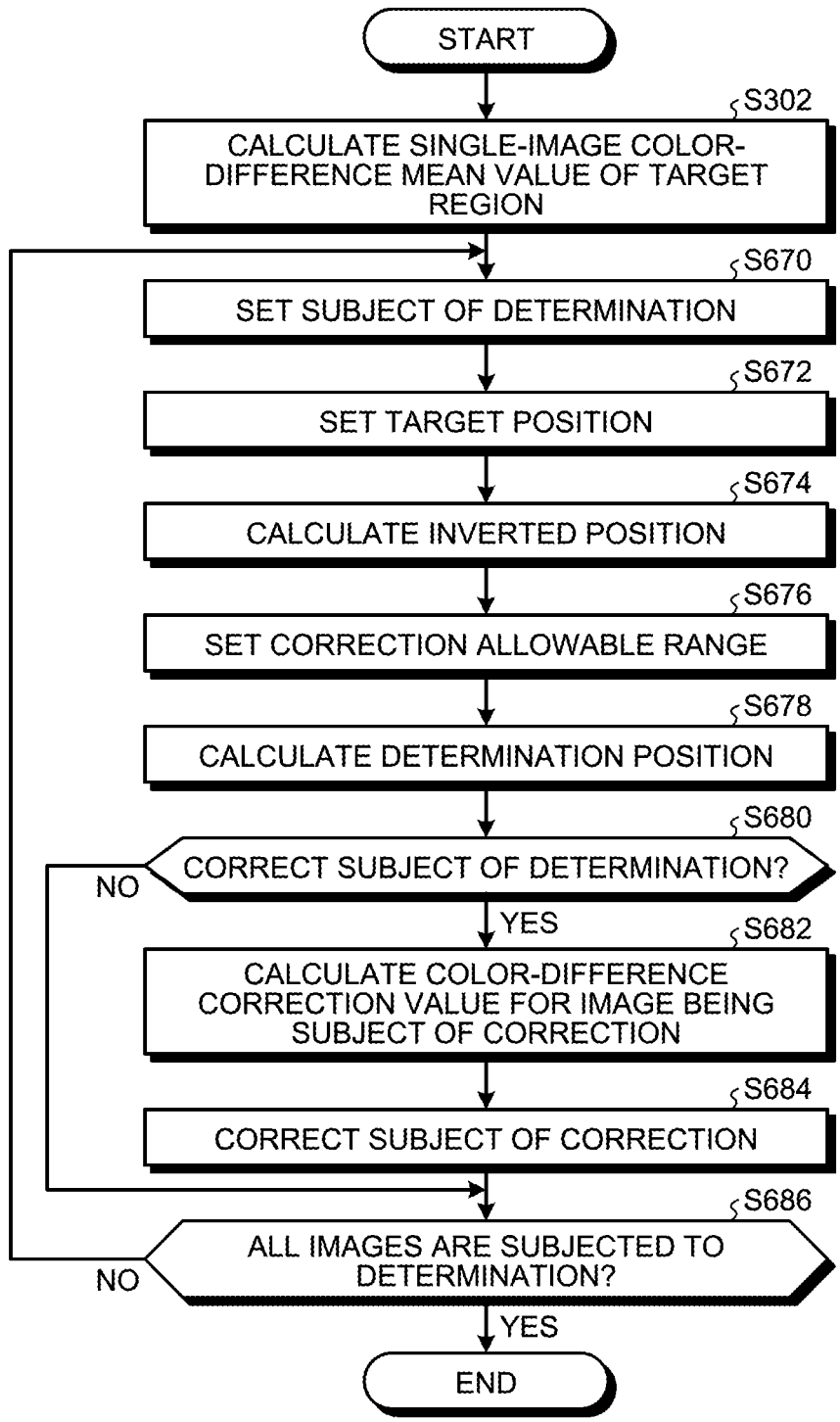

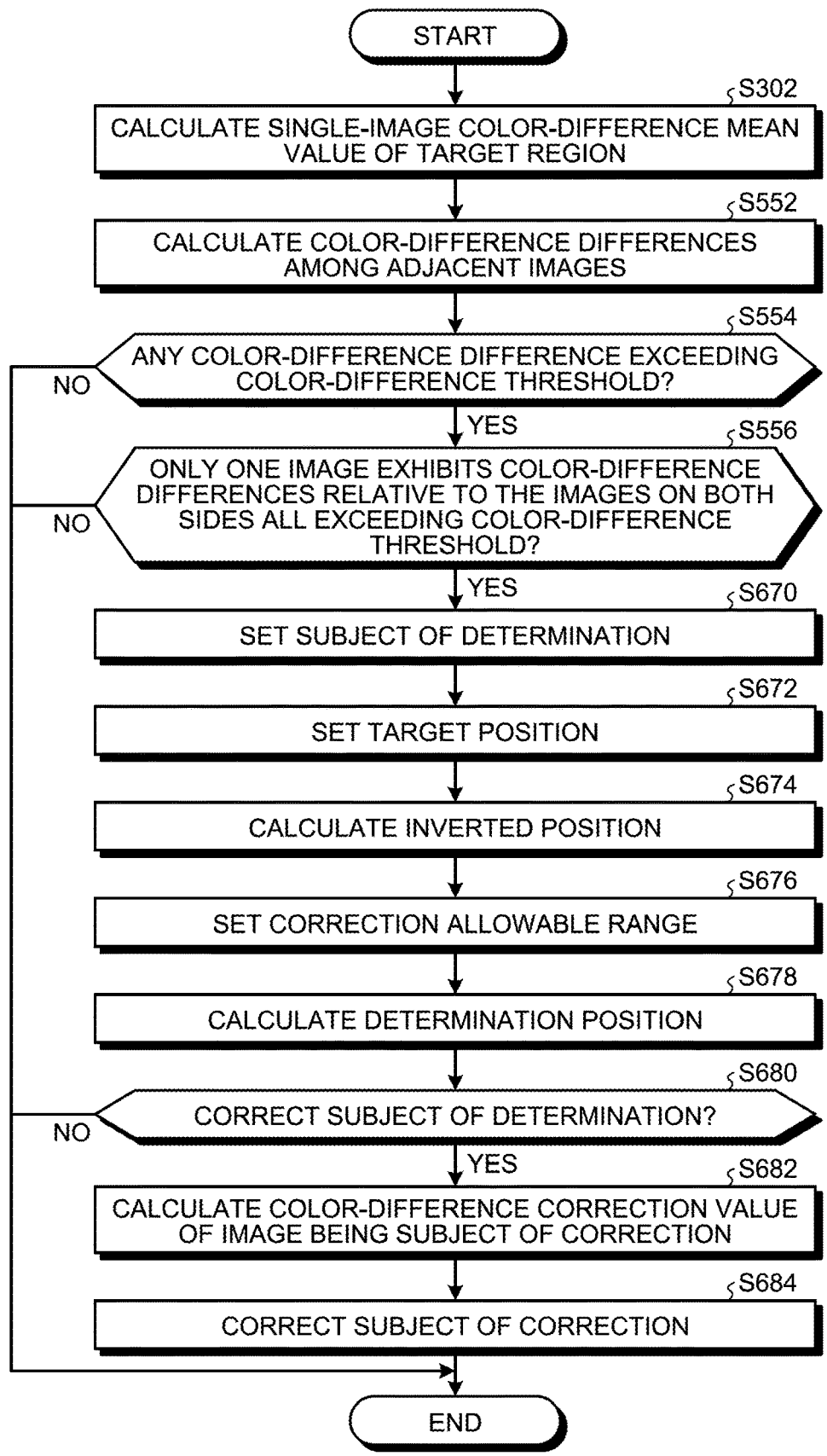
FIG.17 COLOR-DIFFERENCE CORRECTION PROCESS

IMAGE PROCESSING DEVICE

CROSS-REFERENCE TO RELATED APPLICATIONS

This application is based upon and claims the benefit of priority from Japanese Patent Applications No. 2017-114468, filed Jun. 9, 2017 and No. 2018-044493, filed Mar. 12, 2018, the entire contents of which are incorporated herein by reference.

FIELD

Embodiments described herein relate generally to an image processing device.

BACKGROUND

Devices that include multiple imaging units mounted on a mobile object to generate a peripheral image by combining images generated by the imaging units are known. Such a device corrects the peripheral image by substantially equalizing the luminance values of the generated images, to improve the image quality of the peripheral image (disclosed in Japanese Laid-open Patent Application Publication No. 2011-181019, Japanese Patent No. 4739122, and Japanese Laid-open Patent Application Publication No. H08-98204, for example).

However, such a device bears a large calculation load and cannot sufficiently improve the image quality of peripheral images because the peripheral images are corrected based only on the luminance of the entire images.

An object of the present invention is to provide an image processing device which can sufficiently improve the image quality of peripheral images.

SUMMARY

An image processing device comprising: a plurality of imagers disposed on an outer circumference of a mobile object, the imagers that image surroundings of the mobile object to generate multiple images including mutually overlapping regions; a processor that corrects the images on the basis of one single-image color-value mean value and another single-image color-value mean value to generate a peripheral image by combining the corrected images, the one single-image color-value mean value being an average of color values of a target region set in an overlapping region of one of the images, the another single-image color-value mean value being an average of color values of a target region set in an overlapping region of another one of the images.

Thus, the image processing device corrects the color values on the basis of the single-image color-value mean value of the mutually overlapping target regions. Thereby, the image processing device can reduce the calculation load of the correction process and unnaturalness of the color values among the images, and improve the image quality of the peripheral images, compared with the image correction based on the luminance of the entire images.

In the image processing device of the present invention, the imagers are disposed on a front side and a lateral side of the mobile object; and the processor may set the single-image color-value mean value of the image generated by the front-side imager as a reference value and corrects the single-image color-value mean value of the image generated by the lateral-side imager to the reference value.

Thus, the image processing device corrects the lateral-side images on the basis of the front-side image. Thereby, the image processing device can generate the peripheral image upon correcting both lateral-side images without correcting the front-side image which is most viewed by the driver. As a result, the image processing device can reduce a difference between the situation that the driver directly views and the front-side image in the peripheral image, and abate visual unnaturalness that the driver feels.

In the image processing device of the present invention, at least one of the imagers is disposed on a rear side of the mobile object; and the processor may correct the single-image color-value mean value of the image generated by the rear-side imager to the reference value.

Thus, the image processing device corrects the rear-side image on the basis of the front-side image. Thereby, the image processing device can generate the peripheral image upon correcting the rear-side image without correcting the front-side image which is most viewed by the driver. As a result, the image processing device can reduce a difference between the situation that the driver directly views and the front-side image in the peripheral image, and abate visual unnaturalness that the driver feels.

In the image processing device of the present invention, the processor determines, on the basis of the color-value mean values of the target regions and a preset color-value mean value threshold, whether to correct the color values.

Thus, the image processing device determines whether to perform the correction on the basis of the color-value mean value and the color-value mean threshold. Thereby, the image processing device can forbid setting an erroneous correction value when the images contain no road surface, for example, and can prevent the peripheral image from degrading in image quality by an erroneous correction value.

In the image processing device of the present invention, the processor may determine, on the basis of a variation in the color values of the target regions and a preset variation threshold, whether to correct the color values.

Thus, the image processing device determines whether to perform the correction on the basis of the variation in the color values and the variation threshold. Thereby, the image processing device can forbid setting the color-value correction value when the images contain a white line, and can prevent false color arising from the correction value and prevent the degradation of the image quality of the peripheral image.

In the image processing device of the present invention, the processor may determine, on the basis of a preset difference threshold and a difference in the color-value mean values of multiple target regions of one of the images, whether to correct the color values.

Thus, the image processing device determines whether to perform the correction on the basis of the difference in the color-value mean values of one of the images and the difference threshold. Thereby, the image processing device can forbid setting an erroneous correction value when the one image exhibits uneven color values with a great variation, and can prevent the degradation of the image quality of the peripheral image due to an erroneous correction value.

In the image processing device of the present invention, the processor may determine, on the basis of a correction value for correcting the color values and a preset upper-limit correction value, whether to change the correction value to the upper-limit correction value.

Thus, the image processing device can prevent the degradation of the image quality of the peripheral image due to a great color change caused by a large correction value, by using the set correction value and the upper-limit correction value.

In the image processing device of the present invention, the processor may change the correction value to the upper-limit correction value when the correction value for correcting color values exceeds the upper-limit correction value.

Thus, the image processing device can set the correction value to a proper value (i.e., the upper-limit correction value) when the correction value is too large.

In the image processing device of the present invention, the processor may select one of the images as a subject of the color-value correction on the basis of a comparison between a preset color-value threshold and differences in the single-image color-value mean values between the one of the images and another one of the images adjacent to the one of the images.

Thus, the image processing device selects one of the images as a subject of correction through the comparison among the differences among the single-image color-value mean values of the images and the color-value threshold. Thereby, the image processing device can select, as a subject of correction, the image exhibiting greatly different color values from those of the rest of the images due to the corrections performed by the individual imagers, and correct the image, to thereby reduce the difference in color representation from the rest of the images and improve the connectedness of all the images.

In the image processing device of the present invention, the processor may correct the color values of the one of the images when the one of the images satisfies a subject selecting condition that all of the differences in the single-image color-value mean values between the one image and another one of the images adjacent to the one image exceed the color-value threshold, and the rest of the images do not satisfy the subject selecting condition.

Thus, the image processing device sets one of the images as a subject of color-value correction when the one of the images alone satisfies the subject selecting condition. Thereby, the image processing device can correct the image exhibiting greatly different color values from those of the rest of the images due to the corrections performed by the individual imagers, to reduce the difference in color representation from the rest of the images.

In the image processing device of the present invention, the processor may determine whether to correct the color values of each of the images on the basis of whether the color-value mean value of a reference region of the image and the single-image color-value mean value of the image satisfy a predefined complementary condition, the reference region being used by each of the imagers as a reference for the correction.

Thus, the image processing device determines whether to correct the images on the basis of the complementary relationship between the target region and the reference region. Thereby, the image processing device can correct the color values of the image including the target region exhibiting unnatural color representation due to the corrections performed by the individual imagers based on the color values of the reference regions. As a result, the image processing device can reduce unnaturalness of the color representation of the image concerned 70 relative to the rest of the images by correcting the color values thereof and improve the connectedness among the images.

BRIEF DESCRIPTION OF THE DRAWINGS

FIG. 16 is a flowchart of color-difference correction process executed by a corrector of the fourth embodiment; and FIG. 17 is a flowchart of color-difference correction process executed by a corrector of a fifth embodiment.

DETAILED DESCRIPTION

Figure 1:
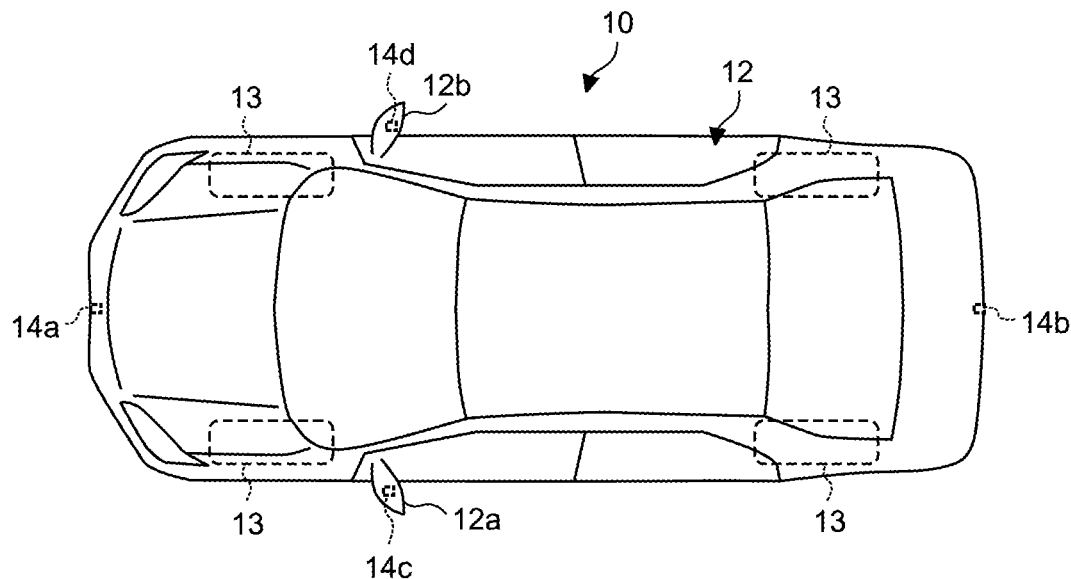
FIG. 1 is a plan view of a vehicle on which an image processing device according to a first embodiment is mounted.

Hereinafter, exemplary embodiments will be described. Throughout the embodiments, same or like elements are denoted by common reference numerals and their overlapping descriptions will be omitted when appropriate.

First Embodiment

FIG. 1 is a plan view of a vehicle 10 on which an image processing device according to a first embodiment is mounted. The vehicle 10 is an exemplary mobile object, and may be an automobile (internal-combustion automobile) including an internal combustion (engine, not illustrated) as a power source, an automobile (electric automobile or fuel-cell automobile) including an electric motor (not illustrated) as a power source, or an automobile (hybrid automobile) including both of them as a power source. The vehicle 1 can incorporate a variety of transmissions and a variety of devices (systems, parts or components) necessary for driving the internal combustion or the electric motor. Types, numbers, and layout of devices involving in driving wheels 13 of the vehicle 10 can be variously set.

As illustrated in FIG. 1, the vehicle 10 includes a vehicle body 12 and multiple (four, for instance) imagers 14a, 14b, 14c, 14d. The imagers 14a, 14b, 14c, 14d will be collectively referred to as imagers 14, unless they need to be individually distinguished.

The vehicle body 12 defines a vehicle interior in which an occupant rides. The vehicle body 12 contains or holds the elements of the vehicle 10, such as the wheels 13 and the imagers 14.

The imagers 14 are, for example, digital cameras incorporating image sensors such as charge coupled devices (CCD) or CMOS image sensors (CIS). The imagers 14 output, as image data, video data containing frame images generated at a certain frame rate, or still image data. The imagers 14 each include a wide-angle lens or a fisheye lens to be able to capture the horizontal angular range of 140 to 190 degrees. The optical axes of the imagers 14 are oriented diagonally downward. The imagers 14 thus image the surroundings of the vehicle 10 including surrounding road surfaces and output image data.

The imagers 14 are disposed on the outer circumference of the vehicle 10. For example, the imager 14a is disposed at about the lateral center of the front (such as a front bumper) of the vehicle 10. The imager 14a generates an image of an area ahead of the vehicle 10. The imager 14b is disposed at about the lateral center of the rear (such as a rear bumper) of the vehicle 10. The imager 14b captures and generates an image of an area behind the vehicle 10. The imager 14c is disposed at about the lengthwise center of the left side (such as a left side mirror 12a) of the vehicle 10 adjacent to the imager 14a and the imager 14b. The imager 14c captures and generates an image of an area on the left side of the vehicle 10. The imager 14d is disposed at about the lengthwise center of the right side (such as a right side mirror 12b) of the vehicle 10 adjacent to the imager 14a and the imager 14b. The imager 14d captures and generates an image of an area on the right side of the vehicle 10. The imagers 14a, 14b, 14c, 14d generate multiple images containing mutually overlapping regions.

Figure 2:
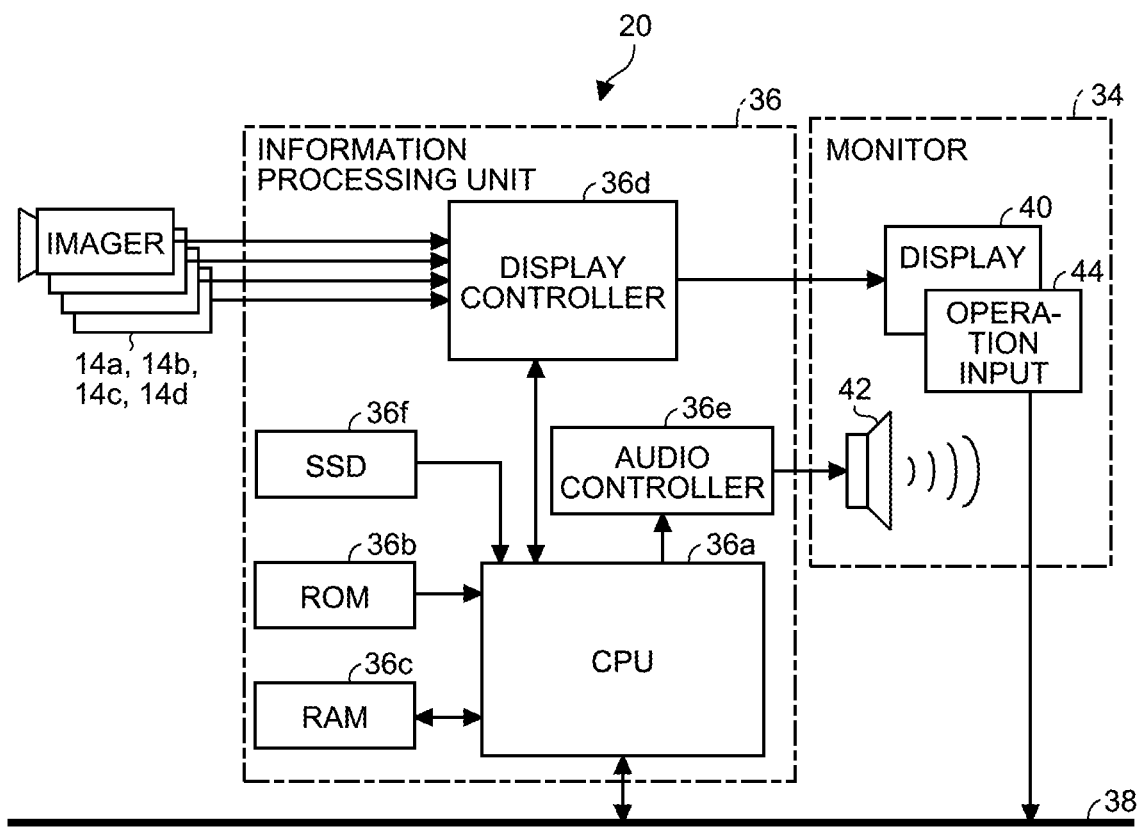
FIG. 2 is a block diagram of the structure of the image processing device mounted on the vehicle.

FIG. 2 is a block diagram of the structure of an image processing device 20 mounted on the vehicle 10. As illustrated in FIG. 2, the image processing device 20 includes the imagers 14, a monitor 34, an image processing unit 36, and an in-vehicle network 38.

The monitor 34 is provided on a dashboard in the vehicle interior, for example. The monitor 34 includes a display 40, an audio output 42, and an operation input 44.

The display 40 displays an image on the basis of image data transmitted from the image processing unit 36. The display 40 is a device such as a liquid crystal display (LCD) and an organic electroluminescent display (OELD). The display 40 displays, for instance, a peripheral image that is generated by the image processing unit 36 by combining the images generated by the imagers 14.

The audio output 42 outputs audio based on audio data transmitted from the image processing unit 36. The audio output 42 is a speaker, for example. The audio output 42 may be disposed at a different position from the display 40 in the vehicle interior.

The operation input 44 receives inputs from the occupant. The operation input 44 is exemplified by a touch panel. The operation input 44 is provided on the screen of the display 40. The operation input 44 is transparent, allowing the image on the display 40 to be see-through. Thereby, the operation input 44 allows the occupant to view images displayed on the screen of the display 40. The operation input 44 receives an instruction from the occupant with his or her touch on the screen of the display 40 corresponding to the image displayed thereon, and transmits the instruction to the image processing unit 36.

The image processing unit 36 is a computer including a microcomputer such as an electronic control unit (ECU). The image processing unit 36 acquires image data from the imagers 14. The image processing unit 36 transmits a peripheral image based on images or audio data to the monitor 34. The image processing unit 36 includes a central processing unit (CPU) 36a, a read only memory (ROM) 36b, a random access memory (RAM) 36c, a display controller 36d, an audio controller 36e, and a solid state drive (SSD) 36f. The CPU 36a, the ROM 36b, and the RAM 36c may be integrated in the same package.

The CPU 36a is an exemplary hardware processor, and reads a program from a non-volatile storage such as the ROM 36b and performs various calculations and controls by the program. The CPU 36a corrects and combines images to generate a peripheral image to be displayed on the display 40, for example.

The ROM 36b stores programs and parameters necessary for execution of the programs. The RAM 36c temporarily stores a variety of kinds of data used in the calculations by the CPU 36a. Among the calculations in the image processing unit 36, the display controller 36d mainly implements image processing to images generated by the imagers 14 and data conversion of images for display on the display 40. The audio controller 36e mainly implements processing to audio for output from the audio output 42. The SSD 36f is a non-volatile, rewritable memory device and retains data irrespective of the power-off of the image processing unit 36.

The in-vehicle network 38 is, for example, a controller area network (CAN). The in-vehicle network 38 electrically connects the image processing unit 36 and the operation input 44, allowing them to mutually transmit and receive signals and information.

According to the present embodiment, the image processing unit 36 deals with image generation process for the vehicle 10 by cooperation of hardware and software (control program). The image processing unit 36 corrects and combines images including surrounding images generated by the imagers 14 to generate a peripheral image.

Figure 3:
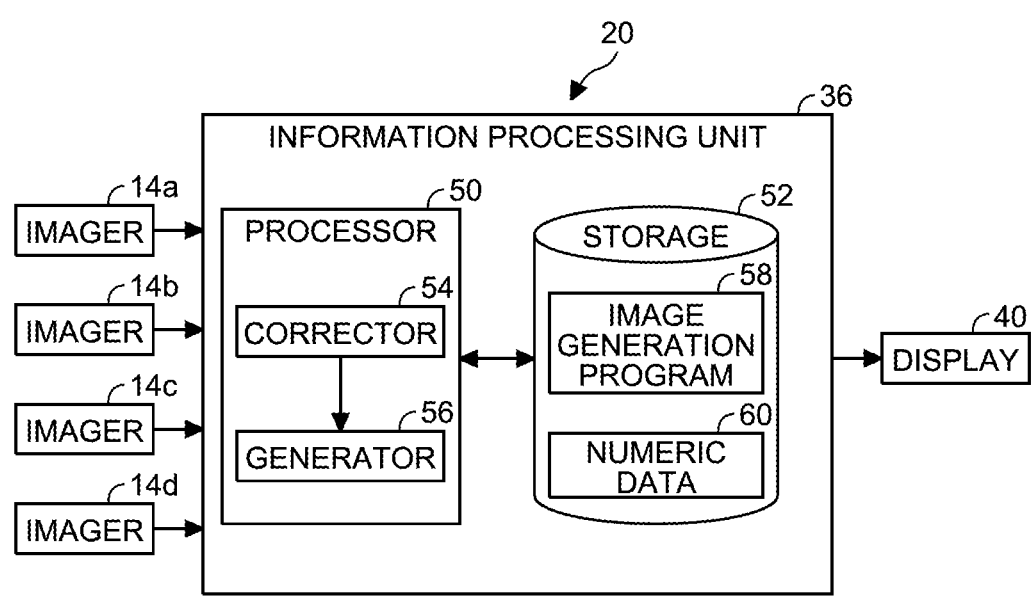
FIG. 3 is a functional block diagram of an image processing unit.

FIG. 3 is a function block diagram of the image processing unit 36. As illustrated in FIG. 3, the image processing unit 36 includes a processor 50 and a storage 52.

The processor 50 is implemented by the functions of the CPU 36a, for example. The processor 50 includes a corrector 54 and a generator 56. The processor 50 may read an image generation program 58 from the storage 52, for example, to implement the functions of the corrector 54 and the generator 56. The corrector 54 and the generator 56 may be partially or entirely made of hardware as circuitry including an application specific integrated circuit (ASIC).

The corrector 54 acquires an image containing multiple overlapping regions from each of the imagers 14. That is, the corrector 54 acquires images of at least the number equal to the number of the imagers 14. The images can be exemplified by one frame of a video. The corrector 54 corrects luminance and color difference of each pixel of each image. Luminance represents Y-values in YUV space, for example. Color difference is an example of a color value representing the color of each pixel. The color difference represents a value obtained by subtracting luminance from a color signal, for instance, U values (values by subtracting luminance from a blue signal) and V values (values by subtracting luminance from a red signal) in YUV space. The corrector 54 sets a target region in each of the overlapping regions. The corrector 54 corrects the luminance of the images through a first correction based on the luminance of the target regions. For example, in the first correction the corrector 54 corrects the luminance by linear interpolation. The corrector 54 corrects the color differences among the images through a second correction based on the color differences in the target regions. In the second correction, for example, the corrector 54 corrects the images on the basis of a single-image color-difference mean value, which represents an average of color differences in the target regions in one image, and another single-image color-difference mean value, which represents an average of color differences in the target regions in another image. That is, the corrector 54 corrects the color differences through the second correction different from the first correction. The single-image color-difference mean values are an exemplary single-image color-value mean value.

For example, the corrector 54 sets the single-image color-difference mean value of the front-side image 70*a* generated by the front-side imager 14*a* as a reference value and sets correction values for the imagers 14*c*, 14*d* on the basis of the reference value, to correct the single-image color-difference mean values of the left-side image and the right-side image by the lateral-side imagers 14*c*, 14*d* to the reference value. Likewise, the corrector 54 sets a correction value for the imager 14*b* on the basis of the single-image color-difference mean value of the front-side image 70*a* by the front-side imager 14*a*, and corrects the single-image color-difference mean value of the rear-side image by the rear-side imager 14*b* to the reference value. The corrector 54 outputs the corrected images to the generator 56.

The generator 56 acquires and combines the corrected images from the corrector 54 to generate a peripheral image. The generator 56 outputs the generated peripheral image to the display 40 for display.

The storage 52 is implemented as the function of at least one of the ROM 36*b*, the RAM 36*c*, and the SSD 36*f*. The storage 52 stores programs to be executed by the processor 50 and necessary data for execution of the programs. For instance, the storage 52 stores the image generation program 58 executed by the processor 50 and numeric data 60 necessary for execution of the image generation program 58.

Figure 4:
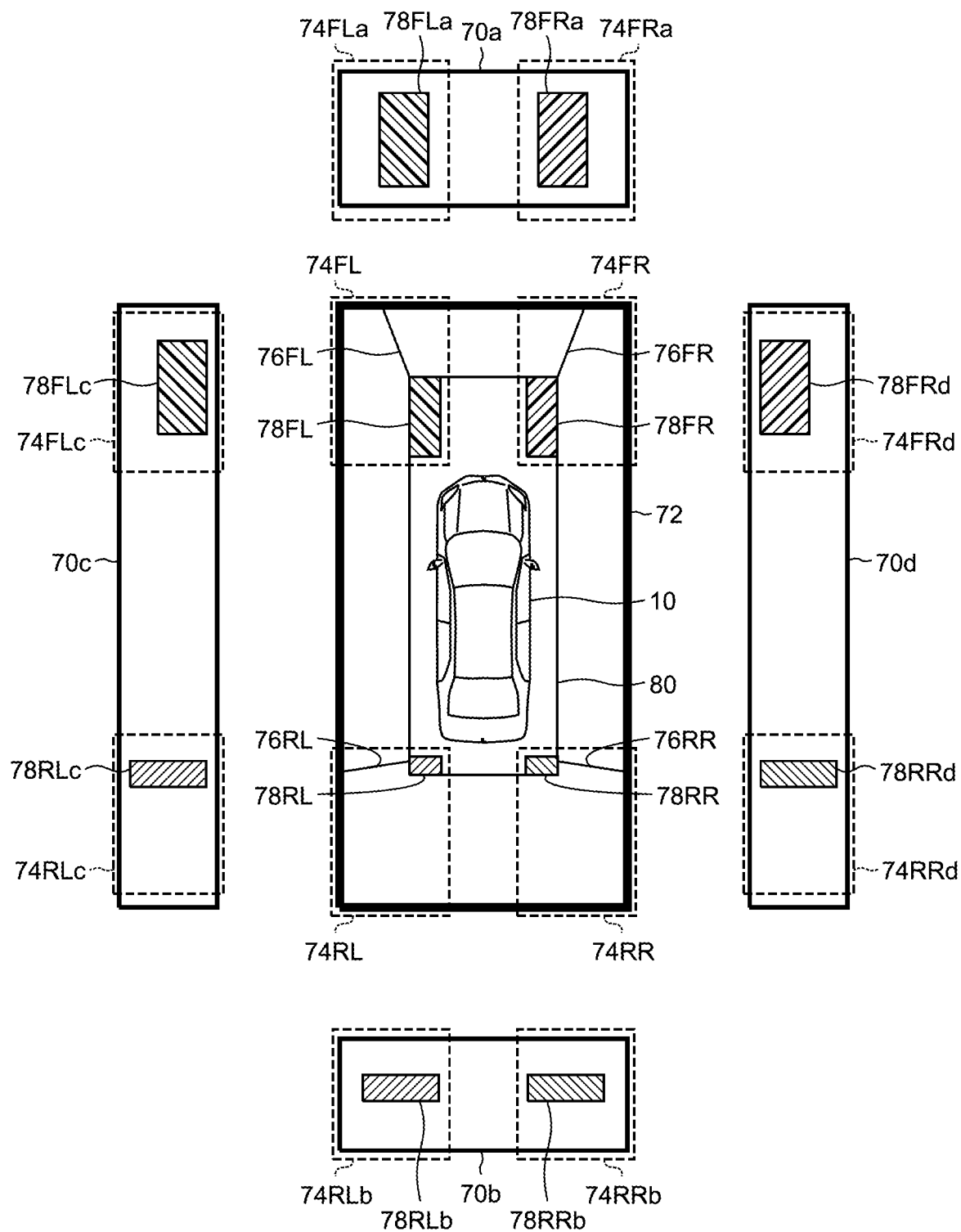
FIG. 4 is a view for illustrating image correction by a corrector.

FIG. 4 is a view for illustrating the image correction by the corrector 54.

In FIG. 4 four images 70*a*, 70*b*, 70*c*, 70*d* acquired by the corrector 54 from the imagers 14*a*, 14*b*, 14*c*, 14*d*, respectively, are surrounded by bold-line rectangular frames. FIG. 4 shows a peripheral image 72 surrounded by a bold-line rectangular frame in the center. The peripheral image 72 is generated by combining the images 70*a*, 70*b*, 70*c*, 70*d*. The peripheral image 72 is an overview image or a bird's-eye view image, showing the surroundings of the vehicle 10 from above. The peripheral image 72 includes an overlapping region 74FL, an overlapping region 74FR, an overlapping region 74RL, and an overlapping region 74RR of the images 70*a*, 70*b*, 70*c*, 70*d*.

The front-side image 70*a* and the left-side image 70*c* include an overlapping region 74FLa and an overlapping region 74FLc, respectively. The overlapping region 74FLa and the overlapping region 74FLc correspond to the overlapping region 74FL. The front-side image 70*a* and the right-side image 70*d* include an overlapping region 74FRa and an overlapping region 74FRd, respectively. The overlapping region 74FRa and the overlapping region 74FRd correspond to the overlapping region 74FR. The rear-side image 70*b* and the left-side image 70*c* include an overlapping region 74RLb and an overlapping region 74RLc, respectively. The overlapping region 74RLb and the overlapping region 74RLc correspond to the overlapping region 74RL. The rear-side image 70*b* and the right-side image 70*d* include an overlapping region 74RRb and an overlapping region 74RRd, respectively. The overlapping region 74RRb and the overlapping region 74RRd correspond to the overlapping region 74RR.

Straight border lines 76FL, 76FR, 76RL, 76RR are illustrated in the peripheral image 72. The border lines 76FL, 76FR, 76RL, 76RR will be collectively referred to as border lines 76 unless they need to be individually distinguished. The border line 76FL is a border between the front-side image 70*a* and the left-side image 70*c*. The border line 76FR is a border between the front-side image 70*a* and the right-side image 70*d*. The border line 76RL is a border between the rear-side image 70*b* and the left-side image 70*c*. The border line 76RR is a border between the rear-side image 70*b* and the right-side image 70*d*. The angles of the border lines 76FL, 76FR, 76RL, 76RR are preset and stored as the numeric data 60 in the storage 52.

The front-side image 70*a* covers the area between the border line 76FL and the border line 76FR. The left-side image 70*c* covers the area between the border line 76FL and the border line 76RL. The right-side image 70*d* covers the area between the border line 76FR and the border line 76RR. The rear-side image 70*b* covers the area between the border line 76RL and the border line 76RR.

The corrector 54 sets target regions 78FL, 78FR, 78RL, 78RR, indicated by hatching, in the overlapping regions 74FL, 74FR, 74RL, 74RR of the peripheral image 72, respectively. The target regions 78FL, 78FR, 78RL, 78RR are also referred to as regions of interest (ROI). The target regions 78FL, 78FR, 78RL, 78RR are not limited to specific regions but may be appropriately set in the respective overlapping regions 74FL, 74FR, 74RL, 74RR by the corrector 54 in accordance with a set frame 80, the angles of the border lines 76, and the width of the vehicle 10. The set frame 80 is exemplified by a preset parking frame. The set frame 80 for setting the target regions 78FL, 78FR, 78RL, 78RR, the angles of the border lines 76, and the width of the vehicle 10 are stored as the numeric data 60 in the storage 52.

The target region 78FLa and the target region 78FRa in the front-side image 70*a* correspond to the target region 78FL and the target region 78FR in the peripheral image 72, respectively. The target region 78RLb and the target region 78RRb in the rear-side image 70*b* correspond to the target region 78RL and the target region 78RR in the peripheral image 72, respectively. The target region 78FLc and the target region 78RLc in the left-side image 70*c* correspond to the target region 78FL and the target region 78RL in the peripheral image 72, respectively. The target region 78FRd and the target region 78RRd in the right-side image 70*d* correspond to the target region 78FR and the target region 78RR in the peripheral image 72, respectively.

The images 70*a* . . . will be collectively referred to as images 70 unless they need to be individually distinguished. The overlapping regions 74FL . . . will be collectively referred to as overlapping regions 74 unless they need to be individually distinguished. The target regions 78FL . . . will be collectively referred to as target regions 78 unless they need to be individually distinguished.

The luminance correction process by the corrector 54 is now described.

The corrector 54 calculates a mean value of the luminance (Y-values) of all the pixels in the target region 78FLa of the front-side image 70*a* (hereinafter, reference left-anterior luminance mean value). The corrector 54 calculates a mean value of the luminance of all the pixels in the target region 78FRa of the front-side image 70*a* (hereinafter, reference right-anterior luminance mean value). The corrector 54 calculates a mean value of the luminance of all the pixels in the target region 78RLb of the rear-side image 70*b* (hereinafter, reference left-posterior luminance mean value). The corrector 54 calculates a mean value of the luminance of all the pixels in the target region 78RRb of the rear-side image 70b (hereinafter, reference right-posterior luminance mean value).

The corrector 54 calculates a mean value of the luminance of all the pixels in the target region 78FLc of the left-side image 70c (hereinafter, left-anterior luminance mean value). The corrector 54 calculates a difference between the reference left-anterior luminance mean value of the target region 78FLa and the left-anterior luminance mean value of the target region 78FLc (hereinafter, left-anterior luminance difference). The corrector 54 corrects the luminance of the target region 78FLc of the left-side image 70c by adding or subtracting the left-anterior luminance difference to or from the luminance of all the pixels in the target region 78FLc, so that the left-anterior luminance mean value becomes equal to the reference left-anterior luminance mean value.

The corrector 54 calculates a mean value of the luminance of all the pixels in the target region 78RLc of the left-side image 70c (hereinafter, left-posterior luminance mean value). The corrector 54 calculates a difference between the reference left-posterior luminance mean value of the target region 78RLb and the left-anterior luminance mean value of the target region 78RLc (hereinafter, left-posterior luminance difference). The corrector 54 corrects the luminance of the target region 78RLc of the left-side image 70c by adding or subtracting the left-posterior luminance difference to or from the luminance of all the pixels in the target region 78RLc, so that the left-posterior luminance mean value becomes equal to the reference left-posterior luminance mean value.

The corrector 54 corrects the luminance of the area outside the target region 78FLc and the target region 78RLc in the left-side image 70c by linear interpolation using the left-anterior luminance mean value of the target region 78FLc and the left-posterior luminance mean value of the target region 78RLc after the correction.

The corrector 54 calculates a mean value of the luminance of all the pixels in the target region 78FRd of the right-side image 70d (hereinafter, right-anterior luminance mean value). The corrector 54 calculates a difference between the reference-right anterior luminance mean value of the target region 78FRa and the right-anterior luminance mean value of the target region 78FRd (hereinafter, right-anterior luminance difference). The corrector 54 corrects the luminance of the target region 78FRd of the right-side image 70d by adding or subtracting the right-anterior luminance difference to or from the luminance of all the pixels in the target region 78FRd, so that the right-anterior luminance mean value becomes equal to the reference right-anterior luminance mean value.

The corrector 54 calculates a mean value of the luminance of all the pixels in the target region 78RRd of the right-side image 70d (hereinafter, right-posterior luminance mean value). The corrector 54 calculates a difference between the reference right-posterior luminance mean value of the target region 78RRb and the right-posterior luminance mean value of the target region 78RRd (hereinafter, right-posterior luminance difference). The corrector 54 corrects the luminance of the target region 78RRd of the right-side image 70d by adding or subtracting the right-posterior luminance difference to or from the luminance of all the pixels in the target region 78RRd, so that the right-posterior luminance mean value becomes equal to the reference right-posterior luminance mean value.

The corrector 54 corrects the luminance of the area outside the target region 78FRd and the target region 78RRd in the right-side image 70d by linear interpolation using the right-anterior luminance mean value of the target region 78FRd and the right-posterior luminance mean value of the target region 78RRd after the correction.

Next, the color-difference correction process by the corrector 54 is described.

The corrector 54 corrects each of the color differences among the images 70 on the basis of one single-image color-difference mean value, which represents an average of the color differences among all the target regions 78 in the overlapping regions 74 of one of the images 70, and another single-image color-difference mean value, which represents an average of the color differences among all the target regions 78 in all the overlapping regions 74 of another one of the images 70.

First, the correction of U values of the color differences is described in detail.

The corrector 54 calculates a single-image color-difference mean value being an average of color differences (herein, U values) in each of the images 70 (i.e., for each of the imagers 14).

Specifically, the corrector 54 calculates a U mean value of the front-side image as an average of U values of the front-side image 70a of the imager 14a by dividing the total sum of U values of both of the target regions 78FLa and 78FRa by the number of pixels in the target regions 78FLa and 78FRa.

Likewise, the corrector 54 calculates a U mean value of the rear-side image as an average of U values of the rear-side image 70b of the imager 14b by dividing the total sum of U values of both of the target regions 78RLb and 78RRb by the number of pixels in the target regions 78RLb and 78RRb.

The corrector 54 calculates a U mean value of the left-side image as an average of U values of the left-side image 70c of the imager 14c by dividing the total sum of U values of both of the target regions 78FLc and 78RLc by the number of pixels in the target regions 78FLc and 78RLc.

The corrector 54 calculates a U mean value of the right-side image as an average of U values of the right-side image 70d of the imager 14d by dividing the total sum of U values of both of the target regions 78FRd and 78RRd by the number of pixels in the target regions 78FRd and 78RRd.

The U mean values of the front-side image, the rear-side image, the left-side image, and the right-side image are examples of the single-image color-difference mean value and the single-image color value, and may be collectively referred to as a single-image U mean value unless they need to be individually distinguished. The color-difference mean value regarding V values will be referred to as a single-image V mean value. The single-image U mean value and V mean value will be collectively referred to as a single-image color-difference mean value unless they need to be individually distinguished.

The corrector 54 sets the U mean value of the front-side image as a reference value, and corrects the U values of the left-side image, the right-side image, and the rear-side image on the basis of a preset correction value for each imager 14, so that the U mean values of the respective images 70 become equal to the reference value.

Specifically, the corrector 54 calculates the difference between the U mean value of the front-side image 70a being the reference value and that of the left-side image 70c as a correction value for the imager 14c. The corrector 54 corrects the U mean value of the left-side image 70c to that of the front-side image 70a by adding or subtracting the correction value to or from the U values of all the pixels in the left-side image 70c generated by the left-side imager 14c. For example, when the U mean value of the left-side image 70c is smaller than that of the front-side image 70a, the corrector 54 adds the correction value to the U value of the imager 14c. When the U mean value of the left-side image 70c is larger than that of the front-side image 70a, the corrector 54 subtracts the correction value from the U value of the imager 14c.

The corrector 54 calculates the difference between the U mean value of the front-side image 70a being the reference value and that of the right-side image 70d as a correction value for the imager 14d. The corrector 54 corrects the U mean value of the right-side image 70d to that of the front-side image 70a by adding or subtracting the correction value to or from the U values of all the pixels in the right-side image 70d generated by the right-side imager 14d.

The corrector 54 calculates the difference between the U mean value of the corrected left-side image (or right-side image) 70c and that of the corrected rear-side image 70b as a correction value for the rear-side imager 14b. The corrector 54 corrects the U mean value of the rear-side image 70b to that of the left-side image (or right-side image) 70c by adding or subtracting the correction value to or from the U values of all the pixels in the rear-side image 70b generated by the rear-side imager 14b.

Thereby, the corrector 54 corrects the U mean values of the left-side image, the right-side image, and the rear-side image to that of the front-side image being the reference value.

The corrector 54 corrects V values in the same manner.

Figure 5:
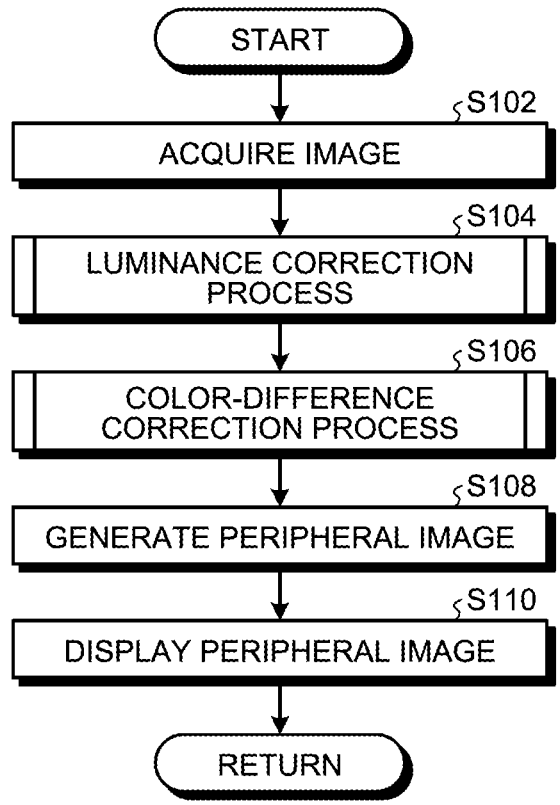
FIG. 5 is a flowchart of image generation process executed by a processor of the first embodiment.

FIG. 5 is a flowchart of the image generation process executed by the processor 50 of the first embodiment. The processor 50 reads the image generation program 58 to execute the image generation process.

As illustrated in FIG. 5, the corrector 54 of the processor 50 acquires the image 70 containing the overlapping regions 74 from each of the imagers 14 (S102). That is, the corrector 54 acquires the same number of images 70 as that of the imagers 14.

The corrector 54 executes luminance correction (the first correction) to the images 70 (S104).

The corrector 54 then executes color-difference (including U value and V value) correction (the second correction) to the images 70 (S106).

The generator 56 combines the corrected images 70 by the corrector 54 to generate the peripheral image 72 (S108).

The generator 56 outputs the peripheral image 72 to the display 40 for display (S110). The processor 50 repeats the step S102 and the following steps to repeatedly generate the peripheral image 72.

Figure 6:
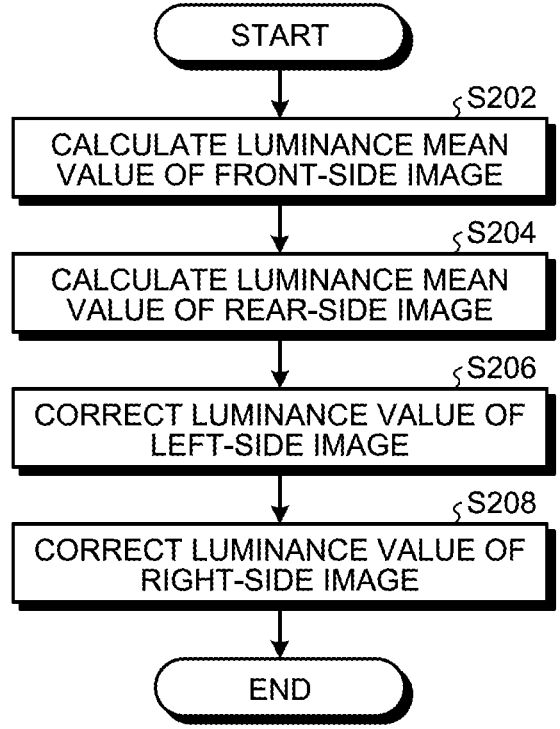
FIG. 6 is a flowchart of luminance correction process executed by the corrector.

FIG. 6 is a flowchart of the luminance correction process executed by the corrector 54.

In the luminance correction process of FIG. 6, the corrector 54 calculates the reference left-anterior luminance mean value and the reference right-anterior luminance mean value as the luminance mean values of the target regions 78FLa, 78FRa of the front-side image 70a, respectively (S202). The corrector 54 calculates the reference left-posterior luminance mean value and the reference right-posterior luminance mean value as the luminance mean values of the target regions 78RLb, 78RRb of the rear-side image 70b, respectively (S204).

The corrector 54 corrects the luminance of the left-side image 70c (S206). Specifically, the corrector 54 corrects the luminance of the target region 78FLc of the left-side image 70c on the basis of the difference between the left-anterior luminance mean value being the luminance mean value of the target region 78FLc and the reference left-anterior luminance mean value. The corrector 54 corrects the luminance of the target region 78RLc of the left-side image 70c on the basis of the difference between the left-posterior luminance mean value being the luminance mean value of the target region 78RLc and the reference left-posterior luminance mean value. The corrector 54 corrects the luminance of the area of the left-side image 70c outside the target regions 78FLc, 78RLc by linear interpolation using the left-anterior luminance mean value and the left-posterior luminance mean value after the correction.

The corrector 54 corrects the luminance of the right-side image 70d (S208). Specifically, the corrector 54 corrects the luminance of the target region 78FRd of the right-side image 70d on the basis of the difference between the right-anterior luminance mean value being the luminance mean value of the target region 78FRd and the reference right-anterior luminance mean value. The corrector 54 corrects the luminance of the target region 78RRd of the right-side image 70d on the basis of the difference between the right-posterior luminance mean value being the luminance mean value of the target region 78RRd and the reference right-posterior luminance mean value. The corrector 54 corrects the luminance of the area outside the target regions 78FRd, 78RR in the right-side image 70d by linear interpolation using the right-anterior luminance mean value and the right-posterior luminance mean value after the correction.

Thereby, the corrector 54 completes the luminance correction process and returns to the image generation process.

Figure 7:
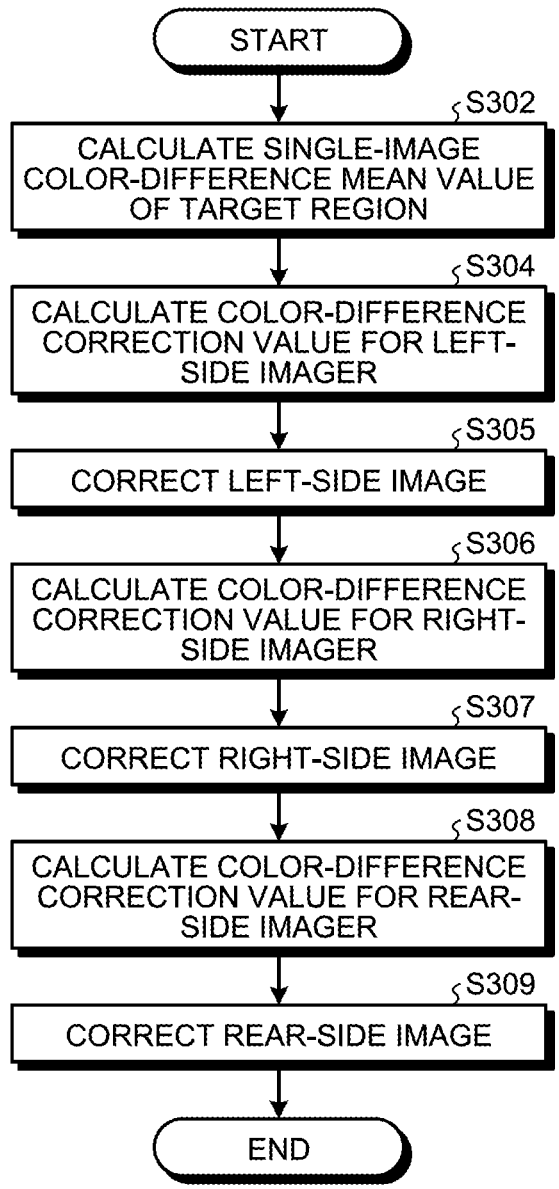
FIG. 7 is a flowchart of color-difference correction process executed by the corrector.

FIG. 7 is a flowchart of the color-difference correction process executed by the corrector 54.

As illustrated in FIG. 7, the corrector 54 calculates the single-image color-difference mean value being the average of color-difference values of the target regions 78 for each of the images 70 (or each of the imagers 14) and for each color difference (S302). Specifically, the corrector 54 divides the total sum of the U values of all the target regions 78 (e.g., target regions 78FLa, 78FRa) of any of the images 70 (e.g., the front-side image 70a) by the number of the pixels in all the target regions 78 to calculate the single-image U mean value (e.g., U mean value of the front-side image) as the color-difference mean value of the U values of the image 70 (e.g., the front-side image 70a). Likewise, the corrector 54 calculates the single-image V mean value (e.g., V mean value of the front-side image). Through repetition of the above process, the corrector 54 calculates the single-image U mean values and V mean values of the images 70 generated by all the imagers 14.

The corrector 54 calculates a correction value for each color difference for the left-side imager 14c (S304). Specifically, the corrector 54 calculates the difference between the U mean values of the front-side image 70a by the imager 14a (i.e., the reference value) and the U mean values of the left-side image 70c by the left-side imager 14c as the U value correction value for the imager 14c. The corrector 54 calculates the difference in the V mean values between the front-side image 70a by the imager 14a and the left-side image 70c by the left-side imager 14c as the V value correction value for the imager 14c. The corrector 54 stores the calculated U value and V value correction values in the storage 52 in association with the imager 14c.

The corrector 54 corrects the left-side image 70c by adding or subtracting, to or from the U value and V value of each pixel in the left-side image 70c, the correction values associated with the U value and V value of the imager 14c of the left-side image 70c (S305). Thus, the corrector 54 corrects the color-difference mean values of the left-side image 70c to the color-difference mean values of the front-side image 70a.

The corrector 54 calculates a correction value for each color difference for the right-side imager 14d (S306). Specifically, the corrector 54 calculates the difference in the U mean values between the front-side image 70a by the imager 14a and the right-side image 70d by the right-side imager 14d as a U value correction value for the imager 14d. The corrector 54 calculates the difference in the V mean values between the front-side image 70a by the imager 14a and the right-side image 70d by the right-side imager 14d as a V value correction value for the imager 14d. The corrector 54 stores the calculated U value and V value correction values in the storage 52 in association with the imager 14d.

The corrector 54 corrects the right-side image 70d by adding or subtracting, to or from the U value and V value of each pixel in the right-side image 70d, the correction values associated with the U value and V value of the imager 14d of the right-side image 70d (S307). Thus, the corrector 54 corrects the color-difference mean values of the right-side image 70d to the color-difference mean values of the front-side image 70a.

The corrector 54 calculates a correction value for each color difference for the rear-side imager 14b (S308). Specifically, the corrector 54 calculates the difference in the U mean values between the corrected left-side image 70c (or corrected right-side image 70d) and the rear-side image 70b by the rear-side imager 14b as the U value correction value for the imager 14b. Herein, the U mean values of the corrected left-side image 70c and right-side image 70d are equal to that of the front-side image 70a. In other words, the corrector 54 sets the U value correction value for the imager 14b, using the U mean value of the front-side image 70a as a reference value. The corrector 54 calculates the difference in the V mean values between the corrected left-side image 70c (or right-side image 70d) and the rear-side image 70b by the rear-side imager 14b as the V value correction value for the imager 14b. The corrector 54 stores the calculated U value and V value correction values in the storage 52 in association with the imager 14b.

The corrector 54 corrects the rear-side image 70b by adding or subtracting, to or from the U value and V value of each pixel in the rear-side image 70b, the correction values associated with the U value and V value of the imager 14b of the rear-side image 70b (S309). Thus, the corrector 54 corrects the color-difference mean values of the rear-side image 70b to the color-difference mean values of the front-side image 70a.

Thereby, the corrector 54 completes the color-difference correction process and returns to the image generation process.

As described above, the image processing device 20 of the first embodiment sets the correction values for the imager 14 having generated a different image 70 on the basis of the single-image color-difference mean value of the target regions 78 in one of the images 70 and that of the target regions 78 in another one of the images 70. Thus, the image processing device 20 corrects the color-differences on the basis of the single-image color-difference mean values of the target regions 78 of the mutually overlapping images 70. Thereby, the image processing device can reduce the calculation load of the correction process and unnaturalness of the color differences among the images 70, and improve the image quality of the peripheral images 72, compared with the calculation of the luminance mean values of all the images. As a result, the image processing device 20 can prevent the degradation of the image quality of the peripheral image 72, particularly the one exhibiting a road surface in different colors in the vicinity of the overlapping area 74 or across the border of the peripheral image 72, for example.

The image processing device 20 sets the correction values for the imagers 14c, 14d to be the single-image color-difference mean values of the left-side image 70c and the right-side image 70d to that of the front-side image 70a, and correct the left-side image 70c and the right-side image 70d. That is, the image processing device 20 corrects the lateral-side images 70c, 70d on the basis of the front-side image 70a. Thereby, the image processing device 20 can correct the lateral-side images 70c, 70d without correcting the front-side image 70a which is most viewed by the driver, to generate the peripheral image 72. As a result, the image processing device 20 can reduce a difference between the situation that the driver directly views and the front-side image of the peripheral image 72, and abate visual unnaturalness that the driver feels.

The image processing device 20 sets the correction values for the imager 14b to be the single-image color-difference mean value of the rear-side image 70b to that of the front-side image 70a and correct the rear-side image 70b. That is, the image processing device 20 corrects the rear-side image 70b on the basis of the front-side image 70a. Thereby, the image processing device 20 can correct the rear-side image 70b without correcting the front-side image 70a which is most viewed by the driver, to generate the peripheral image 72. As a result, the image processing device 20 can reduce a difference between the situation that the driver directly views and the front-side image of the peripheral image 72, and abate visual unnaturalness that the driver feels.

The above embodiments have described the example of correcting the images 70c, 70d, 70b on the basis of the front-side image 70a. However, the example is for illustrative purposes only and not restrictive. For instance, the corrector 54 of the image processing device 20 may estimate or detect the traveling direction of the vehicle 10 and correct the rest of the images 70 on the basis of the image 70 in the estimated or detected traveling direction of the vehicle 10. The corrector 54 may estimate or detect the traveling direction of the vehicle 10 according to the shift position of the shift lever or the direction (or positive or negative) of an output value of the wheel-speed sensor. For example, with the shift lever being at the D-position (i.e., drive position), the corrector 54 can determine that the vehicle 10 travels forward, and correct the images 70c, 70d, 70b on the basis of the front-side image 70a. Thereby, the image processing device 20 can generate the peripheral image 72 more properly representing the situation that the driver directly views.

The image processing device 20 executes the luminance correction and the color-difference correction among the images 70 in different manners. Thereby, the image processing device 20 can abate the phenomenon as blown out highlights and blocked up shadows in any of the images 70, which would occur when the luminance and the color difference are corrected in the same manner. As a result, the image processing device 20 can properly correct variations in the color differences among the images 70 due to the characteristics and the mount positions of the imagers 14, and can improve the image quality of the peripheral images 72 generated from the images 70 by combining them.

The image processing device 20 corrects the images 70 on the basis of the single-image color-difference mean values of the target regions 78 of part of the overlapping regions 74 of the images 70. Thereby, the image processing device 20 can reduce the calculation load of the correction process, compared with the image correction based on the color-difference mean value of all the pixels in the images 70.

Second Embodiment

Next, a second embodiment including a modification of the above color-difference correction process is described. The corrector 54 of the second embodiment can determine whether to perform color-difference correction (i.e., the second correction), under a predefined condition.

For instance, the corrector 54 can determine whether to perform the color-difference correction on the basis of the color-difference mean values (U mean value and V value) being an average of the color differences in the target regions 78, and a preset color-difference mean threshold. The color-difference mean threshold is an exemplary color-value mean threshold and is stored as numeric data 60 in the storage 52.

The corrector 54 can determine whether to perform the color-difference correction on the basis of a variation in the color differences in the target regions 78 and a preset variation threshold. The variation threshold is stored as numeric data 60 in the storage 52.

The corrector 54 can determine whether to perform the color-difference correction on the basis of a difference (including U-difference or V-difference) between the color-difference mean values of two or more target regions 78 (e.g., target regions 78FLa, 78FRa) of one image 70 and a preset difference threshold (including U-difference threshold or V-difference threshold). The difference threshold is stored as numeric data 60 in the storage 52.

Alternatively, the corrector 54 may change the correction value under a predefined condition.

For example, the corrector 54 can determine whether to change a correction value for correcting the color difference to a preset upper-limit correction value on the basis of the color-difference correction value and the upper-limit correction value. The upper-limit correction value represents the upper limit of the correction value and is stored as numeric data 60 in the storage 52.

Figure 8:
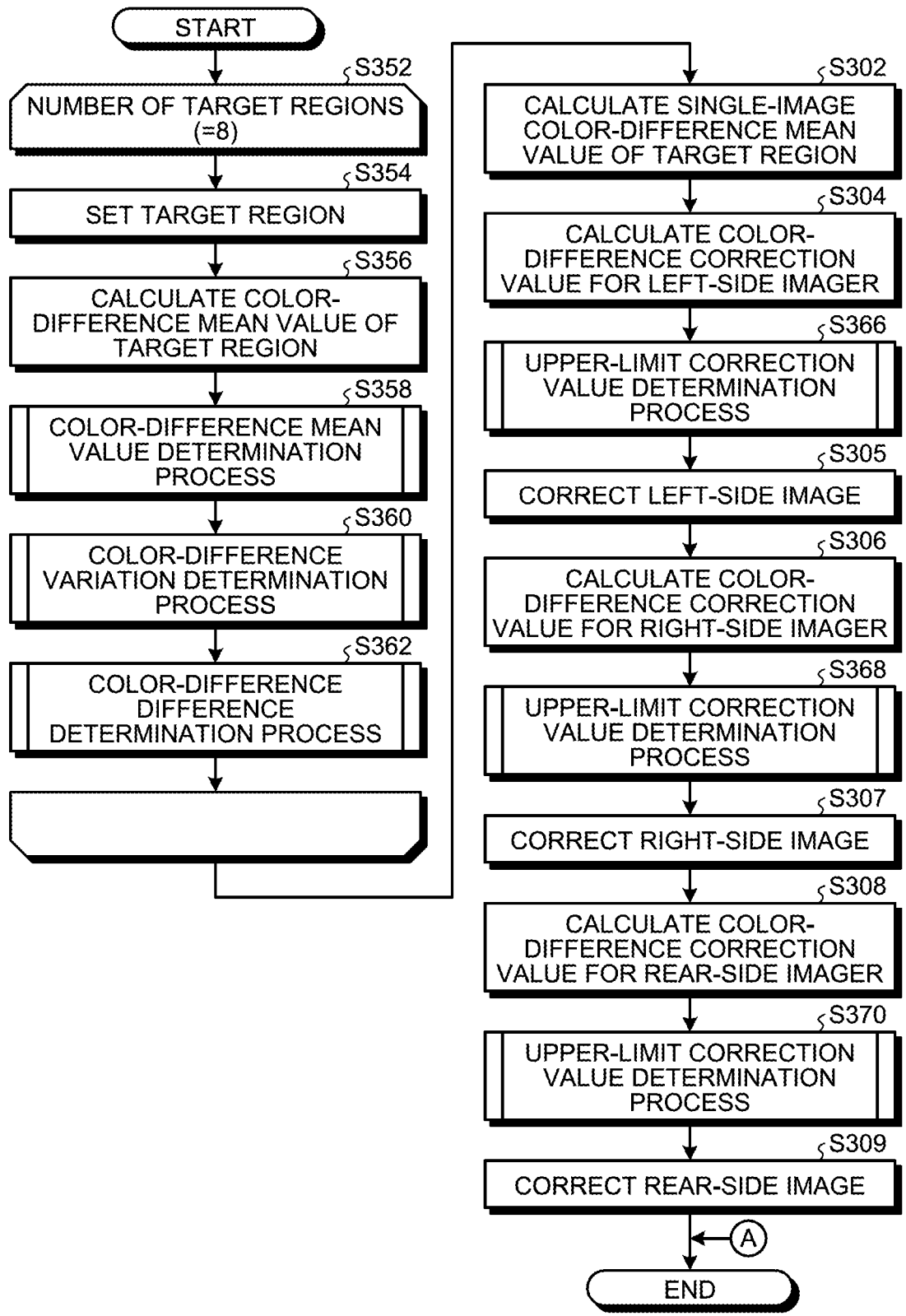
FIG. 8 is a flowchart of color-difference correction process executed by a corrector of a second embodiment.

FIG. 8 is a flowchart of the color-difference correction process executed by the corrector 54 of the second embodiment. The same steps as in the first embodiment will be denoted by the same step numbers, and their description will be omitted.

In the color-difference correction process of the second embodiment, as illustrated in FIG. 8, the corrector 54 repeats the process from S354 to S362 by the number of the target regions 78 (herein, eight) (S352).

The corrector 54 sets one of the target regions 78 as a subject of determination on whether to correct (S354). The order of setting the target regions 78 is not particularly limited as long as the target region 78 set at even ordinal time and the target region 78 set at previous odd ordinal time are located in the same image 70. For example, the corrector 54 may first set the target region 78FLa and then the target regions 78FRa, 78FRd, . . . , 78FLc clockwise in order.

The corrector 54 calculates the color-difference mean values (U mean value and V mean value) of the set target region 78 (S356).

The corrector 54 executes color-difference mean value determination to determine whether to correct the color differences (S358).

Figure 9:
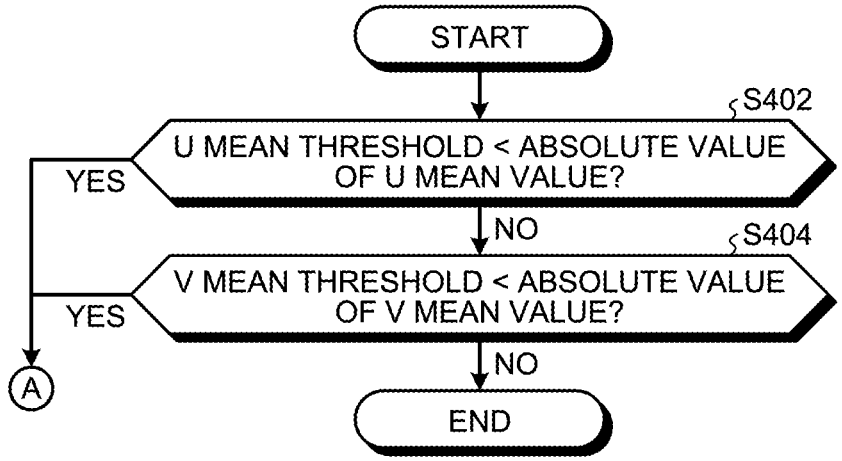
FIG. 9 is a flowchart of color-difference mean value determination process executed by the corrector.

FIG. 9 is a flowchart of the color-difference mean value determination process executed by the corrector 54. Through the color-difference mean value determination process, the corrector 54 forbids setting the color-difference correction value when the images 70 do not contain grey color, that is, road surface.

As illustrated in FIG. 9, in the color-difference mean value determination process the corrector 54 determines whether the absolute value of the U mean value of the target region 78 exceeds a preset U mean threshold (S402). The U mean threshold is set to 50 when the U values are within ±128 gradations, for example.

Upon determining the absolute value of the U mean value of the target region 78 as being the U mean threshold or less (No in S402), the corrector 54 determines whether the absolute value of the V mean value of the target region 78 exceeds a preset V mean threshold (S404). The V mean threshold is set to 50 when the V values are within ±128 gradations, for example. Upon determining the absolute value of the V mean value of the target region 78 as being the V mean threshold or less (No in S404), the corrector 54 completes the color-difference mean value determination process and proceeds to step S360.

Meanwhile, upon determining the absolute value of the U mean value of the target region 78 as exceeding the U mean threshold (Yes in S402) or the absolute value of the V mean value of the target region 78 as exceeding the V mean threshold (Yes in S404), the corrector 54 completes the image generation process without correcting the color differences (refer to circled A in FIG. 8).

Returning to FIG. 8, the corrector 54 executes color-difference variation determination to determine whether to correct the color differences (S360).

Figure 10:
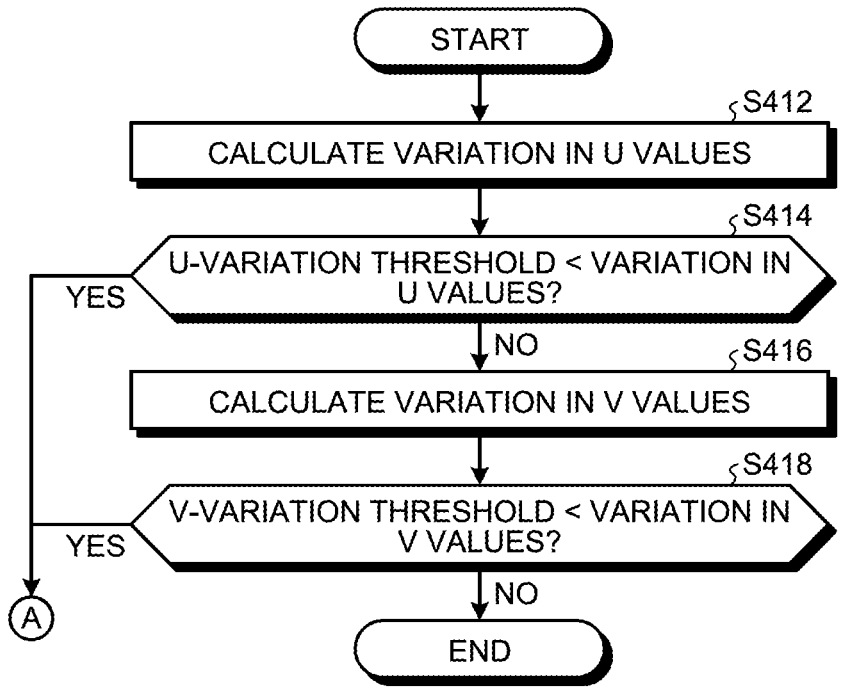
FIG. 10 is a flowchart of color-difference variation determination process executed by the corrector.

FIG. 10 is a flowchart of the color-difference variation determination process executed by the corrector 54. The corrector 54 forbids setting the color-difference correction value through the color-difference variation determination process when the images 70 contain a white line or the like, to prevent false color arising from the correction value.

In the color-difference variation determination process, as illustrated in FIG. 10, the corrector 54 calculates a variation in the U values of the target region 78 (S412). The variation represents a difference between the maximal U value and the minimal U value of the target region 78. The corrector 54 determines whether a variation in the U values exceeds a preset U-variation threshold (S414). The U-variation threshold is set to 20 when the U values are within 256 gradations, for example.

Upon determining the variation in the U values of the target region 78 as being the U-variation threshold or less (No in S414), the corrector 54 calculates a variation in the V values of the target region 78 (S416). The variation represents a difference between the maximal V value and the minimal V value of the target region 78. The corrector 54 determines whether a variation in the V values exceeds a preset V-variation threshold (S418). The V-variation threshold is set to 20 when the V values are within 256 gradations, for example. Upon determining the variation in the V values of the target region 78 as being the V-variation threshold or less (No in S418), the corrector 54 completes the color-difference variation determination process and proceeds to step S362.

Meanwhile, upon determining the variation in the U values of the target region 78 as exceeding the U-variation threshold (Yes in S414) or the variation in the V values of the target region 78 as exceeding the V-variation threshold (Yes in S418), the corrector 54 completes the image generation process without correcting the color differences (refer to circled A in FIG. 8).

Returning to FIG. 8, the corrector 54 executes color-difference difference determination to determine whether to correct the color differences from a difference among the color differences in one of the images 70 (S362).

Figure 11:
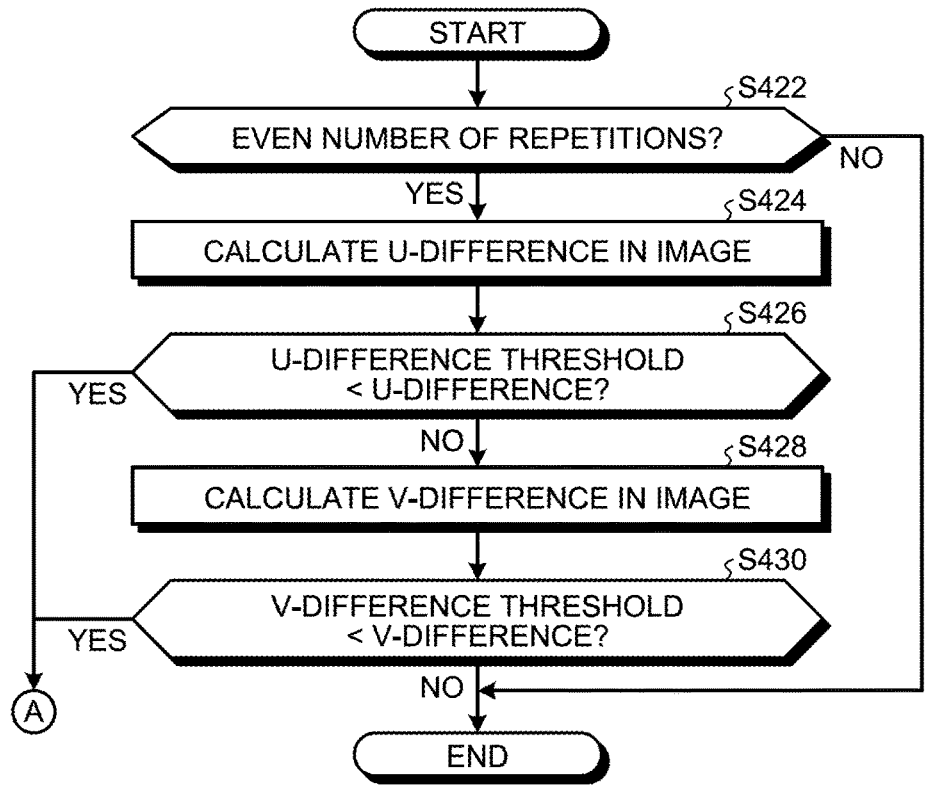
FIG. 11 is a flowchart of color-difference difference determination process executed by the corrector.

FIG. 11 is a flowchart of the color-difference difference determination process executed by the corrector 54. Through the color-difference difference determination process, the corrector 54 forbids setting the color-difference correction value when one of the images 70 exhibits uneven color differences.

In the color-difference difference determination process, as illustrated in FIG. 11, the corrector 54 determines whether the number of repetitions of the process from the step S352 is an even number (S422). An even number of repetitions signify that calculation of the color-difference mean value of a different target region 78 in the image 70 by the same imager 14, for which the color-difference mean value has been calculated in step S356 of the current process, has been completed. Upon determining that the number of repetitions is not an even number (No in S422), the corrector 54 completes the color-difference difference determination process and proceeds to step S352 or S302.

Upon determining that the number of repetitions is an even number (Yes in S422), the corrector 54 calculates a U-difference being a difference between the U mean values of two (e.g., target regions 78FLa, 78FRa) of the target regions 78 of the one image 70 (S424). The corrector 54 determines whether the U-difference exceeds a preset U-difference threshold (S426). The U-difference threshold is set to 10 when the U values are within 256 gradations, for example.

Upon determining the U-difference as being the U-difference threshold or less (No in S426), the corrector 54 calculates a V-difference being a difference between the V mean values of two (e.g., target regions 78FLa, 78FRa) of the target regions 78 of the one image 70 (S428). The corrector 54 determines whether the V-difference exceeds a preset V-difference threshold (S430). The V-difference threshold is set to 10 when the V values are within 256 gradations, for example. Upon determining the V-difference as being the V-difference threshold or less (No in S430), the corrector 54 completes the color-difference difference determination process and proceeds to the step S352 or S302.

Meanwhile, upon determining the U-difference as exceeding the U-difference threshold (Yes in S426) or the V-difference as exceeding the V-difference threshold (Yes in S430), the corrector 54 completes the image generation process without correcting the color difference (refer to circled A in FIG. 8).

Returning to FIG. 8, after the repetitions of the process from step S352 by the number of the target regions 78, the corrector 54 executes the processes in steps S302 and S304 as in the first embodiment to calculate the correction value for each color difference for the imager 14c.

Upon calculation of the correction values for the imager 14c, the corrector 54 proceeds to an upper-limit correction value determination process to determine the upper-limit of the correction value (S366).

Figure 12:
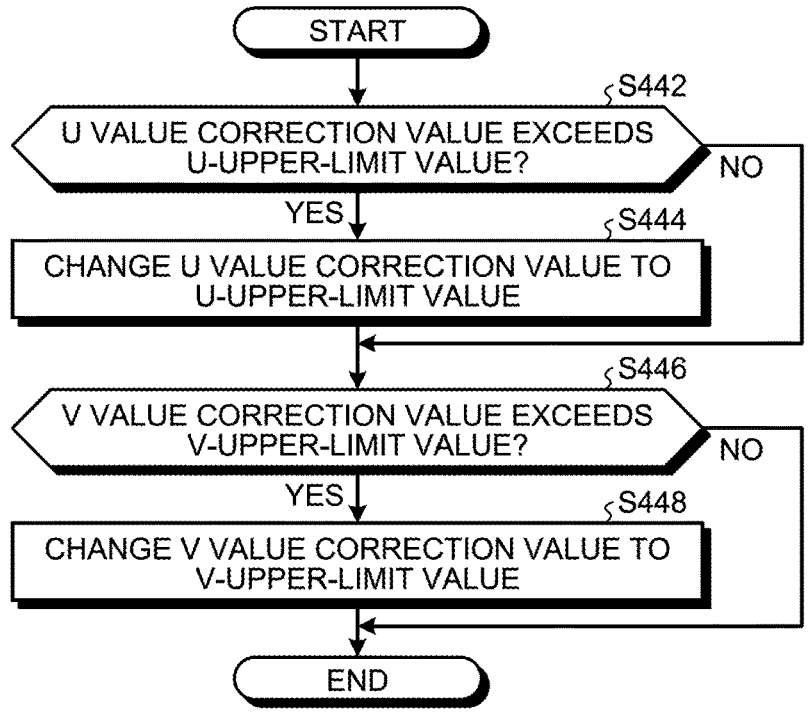
FIG. 12 is a flowchart of upper-limit correction value determination process executed by the corrector.

FIG. 12 is a flowchart of the upper-limit correction value determination process executed by the corrector 54. Through the upper-limit correction value determination process, the corrector 54 prevents degradation of the image quality of the peripheral image 72 due to a great color change caused by a large correction value.

In the upper-limit correction value determination process, as illustrated in FIG. 12, the corrector 54 determines whether the calculated correction value for the U value of the imager 14c exceeds a preset upper-limit U value (S442). The upper-limit U value is set to 35 when the U values are within 256 gradations, for example. The corrector 54 changes the U value correction value of the imager 14c to the upper-limit U value (S444) when the U value correction value exceeds the upper-limit U value (Yes in S442). When the U value correction value is the upper-limit U value or less (No in S442), the corrector 54 maintains the U value correction value with no change.

The corrector 54 determines whether the calculated correction value for the V values exceeds a preset upper-limit V value (S446). The upper-limit V value is set to 35 when the V values are within 256 gradations, for example. The corrector 54 changes the V value correction value of the imager 14c to the upper-limit V value (S448) when the correction value exceeds the upper-limit V value (Yes in S446). When the V value correction value of the imager 14c is the upper-limit V value or less (No in S446), the corrector 54 maintains the V value correction value of the imager 14c with no change.

Thereby, the corrector 54 completes the upper-limit correction value determination process.

Returning to FIG. 8, the corrector 54 corrects the color differences in the image 70c on the basis of the calculated correction values or the upper-limit correction values (S305).

After calculating the color-difference correction values for the right-side imager 14d in step S306, as in the first embodiment, the corrector 54 proceeds to the upper-limit correction value determination process to determine the upper-limit of the correction values (S368). The upper-limit correction value determination process in step S368 is the same as that in step S366 except for that the subject of the determination is the correction values for the right-side imager 14d, therefore, a description thereof is omitted.

Through the process in steps S307 and S308, as in the first embodiment, the corrector 54 corrects the color differences in the image 70c and calculates the color-difference correction values for the rear-side imager 14b. Next, the corrector 54 executes the upper-limit correction value determination to the correction values for the imager 14b (S370). The upper-limit correction value determination process in step S370 is the same as that in step S366 except for that the subject of the determination is the correction values for the rear-side imager 14b, therefore, a description thereof is omitted.

The corrector 54 corrects the color differences in the image 70b on the basis of the calculated correction values or the upper-limit correction values (S309), completing the color-difference correction process.

As described above, in the second embodiment the corrector 54 forbids setting erroneous correction values through the color-difference mean value determination process, when the images 70 contain no road surface, for example. This prevents the peripheral image 72 from degrading in image quality by the correction.

Through the color-difference variation determination process, the corrector 54 forbids setting the color-difference correction value when the images 70 contain a white line, for example. This prevents false color which would otherwise arise from the correction value, and prevents the peripheral image 72 from degrading in image quality by the correction.

Through the color-difference difference determination process, the corrector 54 forbids setting erroneous correction values when one of the images 70 exhibits uneven color differences with a great variation. This prevents the peripheral image 72 from degrading in image quality due to erroneous correction values.

Through the upper-limit correction value determination process, the corrector 54 prevents the peripheral image 72 from degrading in image quality due to a great color change caused by a large correction value. The corrector 54 can set the correction value to a proper value (i.e., the upper-limit correction value) by the color-difference difference determination process when the correction value is too large.

Third Embodiment

Next, a third embodiment including a modification of the above color-difference correction process is described. The corrector 54 of the third embodiment can select one of the imagers 70 as a subject of color-difference correction (i.e., the second correction), according to a predefined condition.

The corrector 54 calculates a single-image color-difference mean value being an average of color differences (herein, U values and V values) of the target regions in each of the images 70 (i.e., for each of the imagers 14). Specifically the corrector 54 calculates a U mean value of the front-side image as an average of U values of the front-side image 70a by the imager 14a by dividing the total sum of U values of both of the target regions 78FLa and 78FRa by the number of pixels in the target regions 78FLa and 78FRa. Likewise, the corrector 54 calculates U mean values of the rear-side image 70b, the left-side image 70c, and the right-side image 70d. The corrector 54 also calculates V mean values of the front-side image, the rear-side image, the left-side image, and the right-side image as an average of V values of the target regions 78 of the images 70a, 70b, 70c, 70d.

The corrector 54 calculates a difference in the single-image color-difference mean values between one of the images 70 and an adjacent image 70 for each color difference. Specifically, the corrector 54 calculates a left-anterior U-difference being a difference in the U mean values between the front-side image and the left-side image. The corrector 54 calculates a right-anterior U-difference being a difference in the U mean values between the front-side image and the right-side image, a left-posterior U-difference being a difference in the U mean values between the rear-side image and the left-side image, and a right-posterior U-difference being a difference in the U mean values between the rear-side image and the right-side image. The corrector 54 also calculates a left-anterior V-difference, a right-anterior V-difference, a left-posterior V-difference, and a right-posterior V-difference in the single-image V mean values among the images 70. The left-anterior U-difference, right-anterior U-difference, left-posterior U-difference, and right-posterior U-difference, and the left-anterior V-difference, right-anterior V-difference, left posterior V-difference, and right-posterior V-difference will be collectively referred to as U-differences, V-differences, or color differences unless they need to be individually distinguished. Each of the color-difference differences may be equal to the correction value in the first and second embodiments.

The corrector 54 selects one of the images 70 as a subject of color-difference correction through a comparison between two or more color-difference differences and a color-difference threshold. The color-difference threshold is an example of a color-value threshold. Specifically, the corrector 54 selects one of the images 70 as a subject of the color-difference correction when the one of the images 70 satisfies a subject selecting condition that four color-difference differences calculated from the color differences in the image concerned 70 all exceed a preset color-difference threshold, and when the rest of the images 70 fail to satisfy the condition. The four color-difference differences calculated from the color differences in the image concerned 70 include color differences in the U values and the V values between the image concerned 70 and the image 70 adjacent to the image concerned 70 on one side and color differences in the U values and the V values between the image concerned 70 and the image 70 adjacent to the image concerned 70 on the opposite side.

Thus, the corrector 54 sets the image 70 as a subject of the correction when only one image 70 exhibits the four color-difference differences, in the U values and V values relative to the adjacent images on both sides, all exceeding the color-difference threshold. For example, the corrector 54 corrects the U value and the V value of the left-side image 70c used in the calculation of the left-anterior U-difference, the left-posterior U-difference, the left-anterior V-difference, and the left-posterior V-difference, when the left-anterior U-difference, the left-posterior U-difference, the left-anterior V-difference, and the left-posterior V-difference calculated from the U value and the V value of the left-side image 70c all exceed the color-difference threshold, satisfying the subject selecting condition, and the rest of the images 70 fail to satisfy the condition.

If the subject of the correction is not the front-side image 70a, the corrector 54 may correct the color differences in the image 70 being the subject of the correction on the basis of the front-side image 70a, as in the color-difference correction processes of the first and second embodiments. If the subject of the correction is the front-side image 70a, the corrector 54 may correct the color differences in the front-side image 70a on the basis of an average of the single-image color-difference mean values of the rest of the images.

Figure 13:
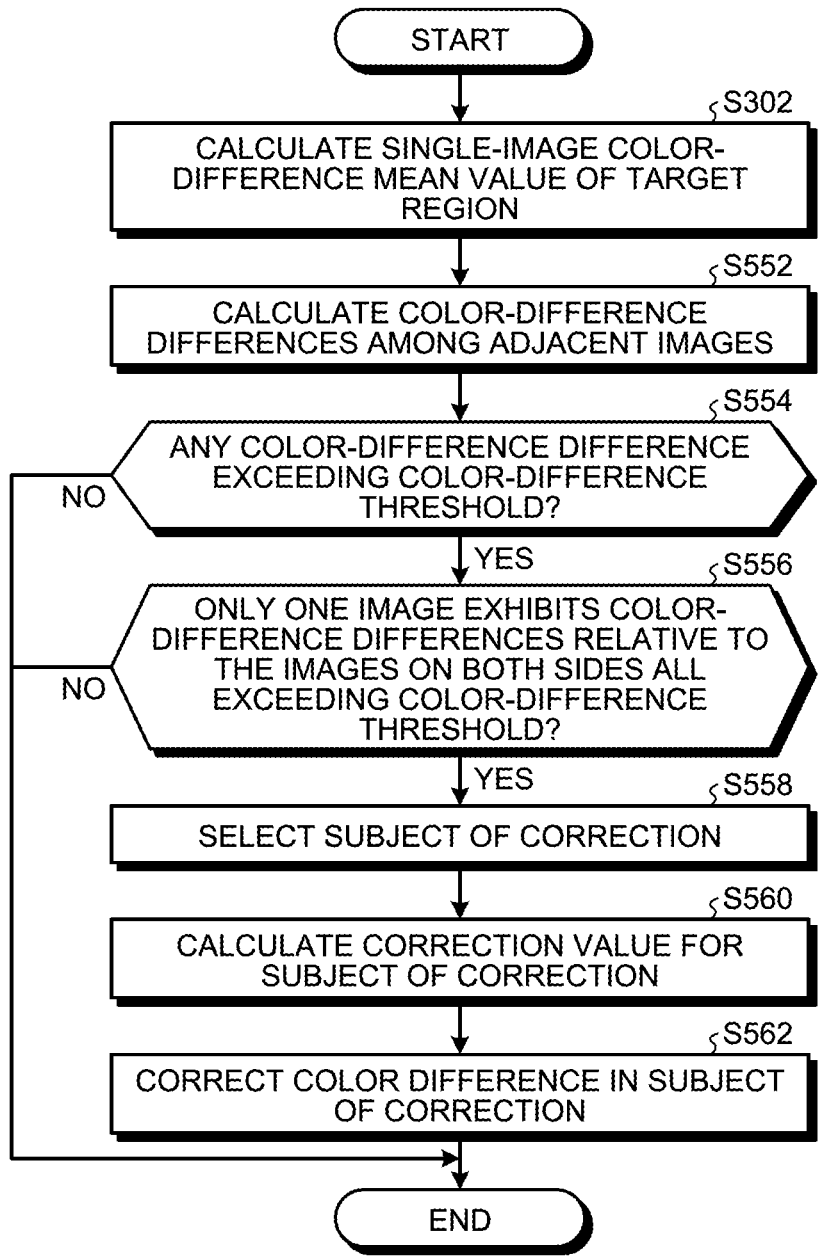
FIG. 13 is a flowchart of color-difference correction process executed by a corrector of a third embodiment.

FIG. 13 is a flowchart of the color-difference correction process executed by the corrector 54 of the third embodiment. The same steps as in the first and second embodiments will be denoted by the same step numbers, and their description will be simplified or omitted.

As illustrated in FIG. 13, in the color-difference correction process of the third embodiment, the corrector 54 calculates a single-image color-difference mean value being an average of the color-difference values of the target regions 78 for each of the images 70 (S302).

The corrector 54 calculate color-difference differences among the single-image color-difference mean values of the adjacent images 70 (S552). Specifically, the corrector 54 calculates, as the U-difference, four differences among the U mean values of the adjacent images among the U mean values of the four images. The corrector 54 calculates, as the V-difference, four differences among the V mean values of the adjacent images among the V mean values of the four images.

The corrector 54 determines if there is any color-difference difference (including U-difference and V-difference) exceeds the color-difference threshold (S554). With no color-difference difference exceeding the color-difference threshold found (No in S554), the corrector 54 completes the color-difference correction process without correcting the color difference. With a color-difference difference exceeding the color-difference threshold found (Yes in S554), the corrector 54 determines for each color difference whether the number of the images 70 exhibiting color-difference differences all exceeding the color-difference threshold relative to the adjacent images 70 on both sides is one (S556).

Upon determining that the number of the images 70 exhibiting such color-difference differences is not one (No in S556), the corrector 54 completes the color-difference correction process without correcting the color difference. Upon determining that the number of the images 70 exhibiting such color-difference differences is one (Yes in S556), the corrector 54 selects the one image 70 as a subject of the correction (S558). That is, the corrector 54 selects the image 70 as a subject of the correction if the number of the images 70 satisfying the subject selecting condition is one.

The corrector 54 calculates a correction value for the subject of the correction (S560). For instance, when the subject of the correction is other than the front-side image 70*a*, the corrector 54 calculates, as the correction value, a difference in the single-image color-difference mean values between the front-side image 70*a* and the subject of the correction. When the subject of the correction is the front-side image 70*a*, the corrector 54 may set, as the correction value, a difference between an average of the single-image color-difference mean values of the left-side image 70*c* and the right-side image 70*d* and the single-image color-difference mean value of the front-side image 70*a*.

The corrector 54 corrects the color differences in the image concerned 70 by adding or subtracting the correction value to or from the color differences thereof (S562).

In the third embodiment, as described above, the corrector 54 compares the color-difference differences and the color-difference threshold to find the image 70 exhibiting color-difference differences exceeding the color-difference threshold, that is, the one having the color differences greatly different from those in the rest of the images 70, and select it for the subject of the correction. Thereby, the corrector 54 can correct the color differences in the image 70 that greatly differ from those in the other images 70 due to white balance corrections by the individual imagers 14, and can reduce the differences in color representation relative to the other images 70 to improve the connectedness among the images 70.

Fourth Embodiment

Next, a fourth embodiment including a modification of the above color-difference correction process is described. The corrector 54 of the forth embodiment can determine whether to correct the color differences (i.e., the second correction) in the image 70 being a subject of determination, under a predefined complementary condition.

The corrector 54 of the fourth embodiment acquires the image 70 and information on a reference region 82 of each image 70 from each of the imagers 14. The reference regions 82 are used by the imagers 14 as a reference of the correction. Herein, the images 70 may be corrected on the basis of a complementary relationship. The corrector 54 corrects the image 70 being a subject of determination when color differences in the target region 78 and those in the reference region 82 of the image concerned 70 satisfy a predefined complementary condition.

Figure 14:
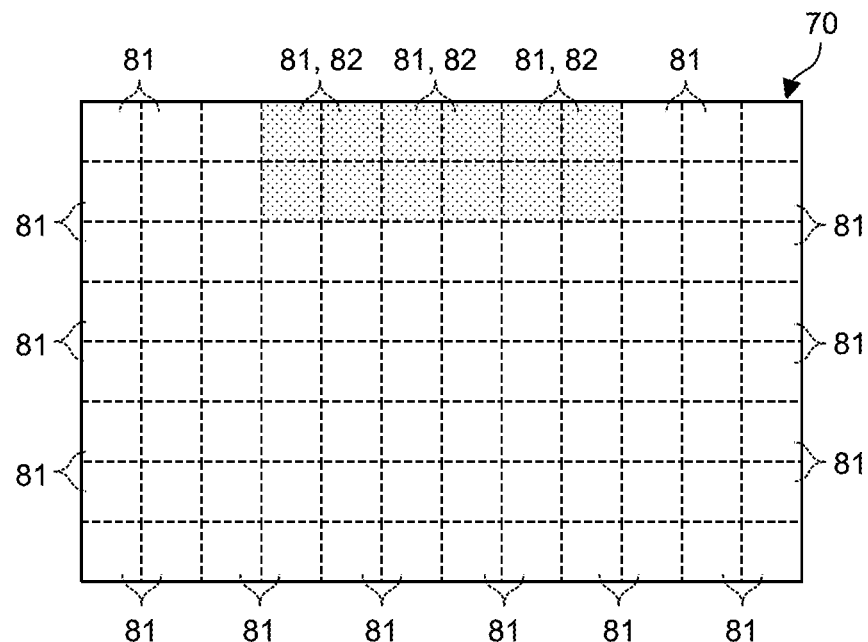
FIG. 14 is a view for illustrating a reference region of an image in a fourth embodiment.

FIG. 14 is a view for illustrating the reference region 82 of the image 70 in the fourth embodiment. As illustrated in FIG. 14, the image 70 contains multiple unit regions 81 as sectioned by broken lines. The reference region 82 is any of the unit regions 81, indicated by dot hatching. Two or more reference regions 82 may be set in each image 70. The reference region 82 may be set by the occupant of the vehicle 10 or automatically set under a predefined condition, for example. The reference region 82 is, for example, a photometric area for the white balance correction by the imagers 14. In this case the imagers 14 correct the color of the reference regions 82 to white.

Figure 15:
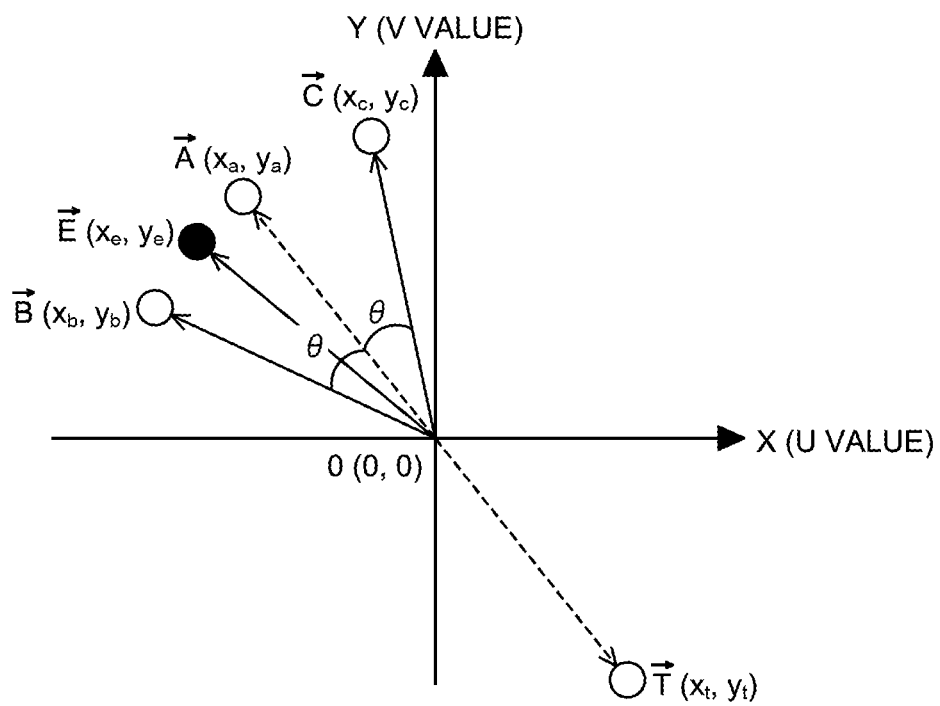
FIG. 15 is a view for illustrating determination on the image based on a complementary condition.

Upon acquiring the image 70 and the information on the reference region 82 from each imager 14, the corrector 54 determines whether to correct the color difference in the image 70 being the subject of determination, on the basis of whether a reference color-difference mean value and the single-image color-difference mean value of the image 70 satisfy the complementary condition. The reference color-difference mean value represents an average of color values of the reference region 82 of the image 70. FIG. 15 is a view for illustrating the determination on the image 70 based on the complementary condition. In FIG. 15 the horizontal axis, or X-axis indicates U value while the vertical axis, or Y-axis indicates V value, that is, FIG. 15 shows UV-coordinate system.

In the determination under the complementary condition, the corrector 54 sets a target position $T(x_t,y_t)$ on UV-coordinate system. An X-coordinate $x_t$ of the target position represents the U mean value of the target region 78 of the image 70 as a subject of determination. A Y-coordinate $y_t$ of the target position represents the V mean value of the same.

The corrector 54 calculates an inverted position $A(x_a,y_a)$ point-symmetric to the target position with respect to the origin. The corrector 54 may calculate the inverted position $A(x_a,y_a)$ by inverting the signs of the coordinates of the target position $T(x_t,y_t)$, as shown in the following expressions (1):

$$x_a = -x_t$$

$$y_a = -y_t \qquad (1)$$

The corrector 54 sets a correction allowable range for the correction determination on the UV-coordinate system by rotating a line passing the origin and the inverted position $A(x_a,y_a)$ by an allowable angle θ about the origin in both directions. The allowable angle θ may be set to 30 to 40 degrees by way of example. Specifically, the corrector 54 calculates a positive allowable position $B(x_b,y_b)$ and a negative allowable position $C(x_c,y_c)$ by rotating the inverted position $A(x_a,y_a)$ by the allowable angle θ about the origin in both directions, by the following expressions (2):

$$x_b = x_a * \cos\theta - y_a * \sin\theta$$

$$y_b = x_a * \sin\theta + y_a * \cos\theta$$

$$x_c = x_a * \cos\theta + y_a * \sin\theta$$

$$y_c = -x_a * \sin\theta + y_a * \cos\theta \qquad (2)$$

The corrector 54 sets, as the correction allowable range, an area between a line passing the origin and the positive allowable position $B(x_b,y_b)$ and a line passing the origin and the negative allowable position $C(x_c,y_c)$ in the circumferential direction from the origin.

The corrector 54 calculates a determination position $E(x_e, y_e)$ from the reference color-difference mean value (herein, including reference U mean value and reference V mean value) being an average of color-difference values of the reference region 82. Specifically, the corrector 54 integrates the U values of the respective pixels of the reference region 82 and divides the integrated value by the number of the pixels to calculate the reference U mean value. The corrector 54 integrates the V values of the respective pixels of the reference region 82 and divides the integrated value by the number of the pixels to calculate the reference V mean value. The corrector 54 sets the calculated reference U mean value and V mean value to the X and Y coordinates of the determination position $E(x_e, y_e)$. When the image 70 includes two or more reference regions 82, the corrector 54 calculates the determination position $E(x_e, y_e)$ for each of the reference regions 82.

The corrector 54 determines whether the determination position $E(x_e, y_e)$ and the target position $T(x_t, y_t)$ are in complementary relationship, on the basis of whether the determination position $E(x_e, y_e)$ is located in the correction allowable range. Specifically, the corrector 54 calculates a first value $\alpha$, a second value $\beta$, a first determination value $\varphi$, and a second determination value $\gamma$ by the following expressions (3):

$$B^p \times E^p = \alpha^p$$
$$C^p \times E^p = \beta^p$$
$$\alpha^p \times \beta^p = \varphi$$
$$A^p \times E^p = \gamma \quad (3)$$

where the inverted position $A(x_a, y_a)$, the positive allowable position $B(x_b, y_b)$, the negative allowable position $C(x_c, y_c)$, and the determination position $E(x_e, y_e)$ are regarded as three-dimensional vectors with Z-components of zero. The corrector 54 calculates the first value $\alpha$ and the second value $\beta$ by the cross product of the vectors. Hence, the first value $\alpha$ and the second value $\beta$ are vectors of Z-directional components alone with X and Y directional components of zero. The corrector 54 calculates the first determination value $\varphi$ and the second determination value $\gamma$ by the inner product of the vectors. If the direction of the determination position E(xe,ye) goes between the positive allowable position $B(x_b, y_b)$ and the negative allowable position $C(x_c, y_c)$, the Z-components of the first value $\alpha$ and the second value $\beta$ are mutually inverse in terms of positive and negative signs. That is, the first determination value $\varphi$ will be a negative scalar being a multiplication of the Z-components of the first value $\alpha$ and the second value $\beta$ when the direction of the determination position E(xe,ye) goes between the positive allowable position $B(x_b, y_b)$ and the negative allowable position $C(x_c, y_c)$.

The corrector 54 corrects the image concerned 70 upon determining that the determination position $E(x_e, y_e)$ falls in the correction allowable range and thus satisfies the complementary condition, upon satisfaction of the following expressions (4):

$$\varphi < 0$$
$$\gamma > 0 \quad (4)$$

For the image 70 containing two or more reference regions 82, the corrector 54 may correct the image 70 if the number of the references regions 82 matches or exceeds a threshold. The threshold may be set under a predefined condition. For instance, the threshold may be a preset fixed value or a value set depending on the number of the reference regions 82 (e.x., half of the number of the reference regions 82.

The corrector 54 may determine the image 70 as being in the correction allowable range and correct it, upon satisfaction of the expressions (4) and a predefined distance condition specifying a distance De from the origin to the determination position $E(x_e, y_e)$. For example, the corrector 54 may correct the image concerned 70 when the distance De satisfies the distance condition including a distance Da from the origin to the inverted position $A(x_a, y_a)$, defined by the following expressions (5):

$$De > Da/\lambda$$
$$De = (x_e^2 + y_e^2)^{1/2}$$
$$Da = (x_a^2 + y_a^2)^{1/2} \quad (5)$$

In other words, the corrector 54 correct the image 70 when the determination position $E(x_e, y_e)$ is away from the origin by a distance $Da/\lambda$ or more. $\lambda$ may be a preset value of two, for instance.

The corrector 54 calculates the color-difference correction value for the image 70 being the subject of correction and corrects the image 70 in the same manner as in the first to third embodiments.

FIG. 16 is a flowchart of the color-difference correction process executed by the corrector 54 of the fourth embodiment. The same steps as in the first to the third embodiments will be denoted by the same step numbers, and their description will be simplified or omitted.

As illustrated in FIG. 16, in the color-difference correction process of the fourth embodiment the corrector 54 sets one of the images 70 as a subject of determination on whether to correct after step S302 (S670). In the case of using the front-side image 70a as a reference for the color-difference correction, the corrector 54 may select a subject of determination from the rest of the images.

The corrector 54 sets a target position $T(x_t, y_t)$ on the UV-coordinate system on the basis of the U mean value and V mean value of the image 70 being the subject of correction determination (S672). The corrector 54 calculates a sign inversion $A(x_a, y_a)$ of the target position $T(x_t, y_t)$ by the expressions (1) (S674). The corrector 54 calculates a positive allowable position $B(x_b, y_b)$ and a negative allowable position $C(x_c, y_c)$ according to the inverted position $A(x_a, y_a)$ and by the expressions (2) and sets a correction allowable range on the UV-coordinate system (S676).

The corrector 54 calculates a determination position $E(x_e, y_e)$(S678). Specifically, the corrector 54 calculates a reference U mean value and a reference V mean value being averages of U values and V values of the reference region 82 on the basis of the image 70 and information on the reference region 82 acquired from each imager 14. The corrector 54 sets the reference U mean value and the reference V mean value to the X and Y coordinates of the determination position $E(x_e, y_e)$.

The corrector 54 determines whether to correct the image 70 being the subject of determination (S680). Specifically, the corrector 54 determines whether to correct the subject of determination on the basis of whether the determination position $E(x_e, y_e)$ is located in the correction allowable range. In this case the corrector 54 calculates the determination values $\varphi, \gamma$ by the expressions (3) including the inverted position $A(x_a, y_a)$, the positive allowable position $B(x_b, y_b)$, the negative allowable position $C(x_b, y_b)$, and the determination position $E(x_e, y_e)$. The corrector 54 calculates the distances De, Da from the origin to the determination position $E(x_e, y_e)$ and the inverted position $A(x_a, y_a)$. The corrector 54 determines whether the determination position $E(x_e, y_e)$ is located in the correction allowable range on the basis of whether the determination values $\varphi, \gamma$ satisfy the expressions (4) and the distances De, Da satisfy the expressions (5), to determine whether to correct the subject of determination.

The corrector 54 determines not to correct the image 70 being the subject of determination when at least either of the determination values $\varphi, \gamma$ and the distances De, Da do not satisfy the expressions (4) or (5), and the determination position $E(x_e, y_e)$ is not within the correction allowable range (No in S680). In this case, the corrector 54 proceeds to step S686 and the following steps without correcting the color differences in the image concerned 70.

The corrector 54 determines to correct the color differences in the image concerned 70 when the determination values φ, γ and the distances De, Da satisfy the expressions (4) and (5) and the determination position $E(x_e, y_e)$ is within the correction allowable range (Yes in S680).

The corrector 54 calculates a color-difference correction value for the image concerned 70 (S682). Specifically, in the case of using the front-side image 70a as a reference, the corrector 54 calculates differences in U values and V values between the front-side image 70a and the image concerned 70 and set them to the U value and V value correction values.

The corrector 54 corrects the image concerned 70 using the color-difference correction values (S684). Specifically, the corrector 54 corrects the image concerned 70 by adding or subtracting the calculated correction values to or from the U values and the V values of the image 70.

The corrector 54 determines whether all the images 70 have been subjected to the determination (S686). With the color differences in the front-side image 70a set as a reference of correction, the corrector 54 may exclude the front-side image 70a from subjects of determination. Upon determining that the images 70 have not been entirely subjected to the determination (No in S686), the corrector 54 repeats the process from step S670. When determining that all the images 70 have been subjected to the determination (Yes in S686), the corrector 54 completes the color-difference correction process.

In the fourth embodiment, as described above, the corrector 54 determines whether to correct the image 70 being a subject of determination on the basis of the complementary relationship between the target region 78 and the reference region 82. Thereby, the corrector 54 can select, as a subject of correction, the image 70 including the target region 78 exhibiting unnatural color representation relative to the other images 70 that has resulted from the corrections by the individual imagers 14 based on the complementary relationship between the color differences in the reference regions 82. Thus, the corrector 54 corrects the color differences in the image concerned 70 to thereby reduce unnaturalness of color representation relative to the rest of the images 70 and improve the connectedness of all the images 70.

For example, when one of the imagers 14 corrects the color differences in the reference region 82 of the image 70 through white balance correction based on the complementary relationship, the color-difference mean value of the target region 78 complementary with the reference region 82 will be away from the origin in the UV-space. Thus, the color representation of the target region differs from that of the rest of the images 70, causing unnaturalness of the image 70 corrected by the imager concerned 14 with respect to the rest of the images 70. In view of this, the corrector 54 sets the image 70 including the target region substantially complementary with the reference region 82 as a subject of correction, which makes it possible to abate unnaturalness of color representation of the image 70, caused by the correction by the imager concerned 14, with respect to the rest of the images 70.

Fifth Embodiment

Next, a fifth embodiment being a combination of the third and fourth embodiments is described. FIG. 17 is a flowchart of the color-difference correction process executed by the corrector 54 of the fifth embodiment. The same steps as in the first to the forth embodiments will be denoted by the same step numbers, and their description will be simplified or omitted.

As illustrated in FIG. 17, in the color-difference correction process of the fifth embodiment, after steps S302, S552, S554, the corrector 54 determines for each color difference whether the number of images 70, which exhibits differences among color differences, relative to the adjacent images 70 on both sides, all exceeding the color-difference threshold, is one (S556).

When the number of images 70 having color-difference differences (including U-difference and V-difference) relative to the adjacent images 70 on both sides all exceeding the color-difference threshold is not one (No in S556), the corrector 54 completes the color-difference correction process without correcting the color differences.

When the number of images 70 having color-difference differences relative to the adjacent images 70 on both sides all exceeding the color-difference threshold is one (Yes in S556), the corrector 54 sets the image concerned 70 as a subject of determination (670).

After steps S672, S674, S676, and S678, the corrector 54 determines whether to correct the image concerned 70 (S680). Upon determining to correct the image concerned 70 (Yes in S680), the corrector 54 calculates a correction value for the image 70 (S682).

The corrector 54 corrects the color differences in the image concerned 70 according to the correction value (S684) and completes the color-difference correction process. According to the fifth embodiment, the number of images 70 being a subject of determination is one at most, therefore, the corrector 54 omits step S686.

Being the combination of the third and fourth embodiments, the fifth embodiment can attain the effects of the third and fourth embodiments. Specifically, in the fifth embodiment the corrector 54 selects any of the images 70 as a subject of determination on the basis of the color-difference differences among the images 70, and determines whether to correct the subject of determination on the basis of the complementary relationship between the color differences of the target region 78 and the reference region 82. Thereby, the corrector 54 can correct the color differences in the image concerned 70 that exhibits different color representation from that of the rest of the images 70 due to the correction such as white balance correction based on the complementary relationship, and can abate unnaturalness of the color representation of the image concerned 70 relative to the rest of the images 70.

The functions, connections, numbers, and arrangement of the elements of the first to fifth embodiments may be modified, added, or deleted when appropriate within the scope of the present invention or the scope of equivalency thereof. The embodiments may be combined when appropriate. The steps in the embodiments may be changed in order when appropriate.

The above embodiments have described the example of calculating the correction value in each image generation process, however, the example is for illustrative purposes only and not restrictive. Alternatively, the correction value may be calculated once in multiple image generation processes, or calculated only at the time of startup of the image processing unit 36, for instance.

The above embodiments have described the example of setting the target regions 78 of part of the overlapping regions 74 to the subject of the luminance and color-difference corrections, however, the example is for illustrative purposes only and not restrictive.

Alternatively, the target regions 78 may be enlarged to match the overlapping regions 74.

The second embodiment has described the example of executing all of the color-difference mean value determination process, the color-difference variation determination process, the color-difference difference determination process, and the upper-limit correction value determination process, however, the example is for illustrative purposes only and not restrictive. The image processing device 20 may execute one or two or more of the determination processes.

The above embodiments have described the vehicle 10 as an example of a mobile object, however, the mobile object is not limited thereto. The mobile object may be an airplane, a ship, or a bicycle, for instance.

The above embodiments have described the example in which the corrector 54 corrects the color differences (or color values) on the basis of the differences in the color-difference mean values between the front-side image, and each of the right-side, left-side, and rear-side images, however, the example is for illustrative purposes only and not restrictive. For example, the corrector 54 may correct the color differences on the basis of a ratio of the color-difference mean value of each of the right-side, left-side, and rear-side images to the color-difference mean value of the front-side image. In this case the corrector 54 may correct the color differences in the image by dividing the color differences (or color values) by the ratio.

The above embodiments have described the color difference as an example of color value, however, the color value is not limited thereto. The color value needs to represent the degree of colors, and may be brightness (or luminance) of red, blue, and green of RGB representation, for example.

The first to third embodiments have described the example in which the corrector 54 corrects the color-difference mean values of the left-side image, the right-side image, and the rear-side image to the color-difference mean value of the front-side image. However, the example is for illustrative purposes only and not restrictive. For instance, the corrector 54 may correct the color-difference mean values of the left-side image, the right-side image, and the front-side image to the color-difference mean value of the rear-side image. That is, using the color-difference mean value of one image as a reference, the corrector 54 may correct the color-difference mean values of the rest of the images to the color-difference mean value of the one image.

The above embodiments have described the example in which the corrector 54 corrects the image 70 containing two or more overlapping regions. However, the example is for illustrative purposes only and not restrictive. For example, the corrector 54 may correct multiple images 70 containing only one overlapping region 74 in the same manner as in the above embodiments.

The fourth and fifth embodiments have described the example in which the corrector 54 corrects the image 70 being a subject of determination upon satisfaction of the expressions (4) and (5). The condition for the correction determination is not limited thereto. For instance, the corrector 54 may correct the image 70 being a subject of determination upon satisfaction of the expressions (4) i.e., irrespective of the expressions (5). Alternatively, the corrector 54 may determine to correct the subject of determination when the determination values $\varphi$, $\gamma$ are zero.

The fourth embodiment have described the example in which the corrector 54 sets the correction allowable range according to the inverted position $A(x_a,y_a)$ set opposite to the target position $T(x_t,y_t)$, and determines whether to correct the subject of determination on the basis of whether the determination position $E(x_e,y_e)$ is located in the correction allowable range. However, correction determination method is not limited thereto. For instance, the corrector 54 may set the correction allowable range according to the inverted position $A(x_a,y_a)$ set opposite to the determination position $E(x_e,y_e)$, and determine whether to correct the subject of determination on the basis of whether the target position $T(x_t,y_t)$ is located in the correction allowable range.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An image processing device comprising:
a plurality of imagers that are disposed on an outer circumference of a mobile object and that image surroundings of the mobile object to generate multiple images, the images each including an overlapping region that overlaps with another one of the images, the overlapping region including a target region that is set in a part of the overlapping region and a non-target region outside of the target region in the overlapping region;
a processor that corrects the images based on a first value and a second value to generate a peripheral image by combining the corrected images, the first value being an average of color values of the target region of the overlapping region of one of the images, the second value being the average of the color values of the target region of the overlapping region of another one of the images, wherein
the processor combines the corrected images such that the overlapping region between a first corrected image and a second corrected image includes the target region that is covered by at least one of the first corrected image and the second corrected image, a first region that is covered by only the first corrected image, and a second region that is covered by only the second corrected image,
the target region is provided toward the mobile object with respect to the first region and the second region, and
the processor determines whether to correct the color values of the images based on whether the average of the color values of a reference region of the images and the average of the color values of the images satisfy a predefined complementary color condition, the average of the color values of the reference region being used by each of the imagers as a reference for the correction.

2. The image processing device according to claim 1, wherein
the imagers are disposed on a front side and a lateral side of the mobile object; and
the processor sets a third value as a reference value and corrects a fourth value to the reference value, the third value being the average of the color values of the target region set in the overlapping region of the image generated by the front-side imager, the fourth value being the average of the color values of the target region set in the overlapping region of the image generated by the lateral-side imager.

3. The image processing device according to claim 2, wherein at least one of the imagers is disposed on a rear side of the mobile object; and the processor corrects a fifth value to the reference value, the fifth value being the average of the color values of the target region set in the overlapping region of the image generated by the rear-side imager.

4. The image processing device according to claim 1, wherein the processor determines, based on the average of the color values of the target region and a threshold, whether to correct the color values.

5. The image processing device according to claim 1, wherein the processor determines, based on a variation in the color values of the target region and a threshold, whether to correct the color values.

6. The image processing device according to claim 1, wherein the processor determines, based on a threshold and a difference in averages of the color values of multiple target regions of one of the images, whether to correct the color values.

7. The image processing device according to claim 1, wherein the processor determines, based on a correction value for correcting the color values and a preset upper-limit, whether to change the correction value to the upper-limit.

8. The image processing device according to claim 7, wherein the processor changes the correction value to the upper-limit when the correction value exceeds the upper-limit.

9. The image processing device according to claim 1, wherein the processor selects one of the images to be corrected, based on a comparison between a threshold and differences in the average of the color values between the one of the images and another one of the images adjacent to the one of the images.

10. The image processing device according to claim 9, wherein the processor corrects the color values of the one of the images when the one of the images satisfies a condition that the differences exceed the threshold, and other images different from the one of the images do not satisfy the condition.

11. The image processing device according to claim 1, wherein the average of the color values of the images is an average of color values of the target region.

* * * * *